US010303908B2

(12) United States Patent
Nair et al.

(10) Patent No.: US 10,303,908 B2
(45) Date of Patent: May 28, 2019

(54) MOBILE DEVICE WITH WRIST NEUTRAL DATA CAPTURE

(71) Applicant: SYMBOL TECHNOLOGIES, LLC, Lincolnshire, IL (US)

(72) Inventors: Chandra M. Nair, Mount Sinai, NY (US); JaeHo Choi, Whitestone, NY (US); Konstantinos Tsiopanos, Selden, NY (US)

(73) Assignee: Symbol Technologies, LLC, Holtsville, NY (US)

(*) Notice: Subject to any disclaimer, the term of this patent is extended or adjusted under 35 U.S.C. 154(b) by 53 days.

(21) Appl. No.: 15/370,330

(22) Filed: Dec. 6, 2016

(65) Prior Publication Data

US 2018/0157880 A1 Jun. 7, 2018

(51) Int. Cl.
*G06K 7/10* (2006.01)
*G06F 1/16* (2006.01)
*G06K 7/14* (2006.01)
*G06N 20/00* (2019.01)

(52) U.S. Cl.
CPC ....... *G06K 7/10603* (2013.01); *G06F 1/1684* (2013.01); *G06K 7/10722* (2013.01); *G06K 7/10881* (2013.01); *G06K 7/1413* (2013.01); *G06N 20/00* (2019.01); *G06K 2007/10524* (2013.01)

(58) Field of Classification Search
CPC .......... G06K 7/10881; G06K 7/10861; G06K 7/10712; G06K 7/10732
USPC .............................. 235/462.2, 462.23, 462.25
See application file for complete search history.

(56) References Cited

U.S. PATENT DOCUMENTS

| 5,796,088 | A | 8/1998 | Wall | |
|---|---|---|---|---|
| 8,517,273 | B2* | 8/2013 | Tamburrini | G06K 7/10881 235/470 |
| 9,129,172 | B2* | 9/2015 | Ren | H04N 5/37213 |
| 9,262,660 | B2* | 2/2016 | Lu | G06K 7/10722 |
| 2008/0192129 | A1* | 8/2008 | Walker | G11B 27/034 348/231.2 |
| 2009/0044003 | A1* | 2/2009 | Berthiaume | G06F 21/57 713/100 |
| 2009/0121026 | A1 | 5/2009 | Druker et al. | |
| 2014/0014727 | A1 | 1/2014 | Choi et al. | |

OTHER PUBLICATIONS

International Search Report and Written Opinion for International Patent Application No. PCT/US2017/059673 dated Feb. 15, 2018.

* cited by examiner

*Primary Examiner* — Daniel St Cyr

(57) ABSTRACT

A mobile device with wrist neutral data capture is provided. The device comprises: a housing; a data capture component configured to change an aiming pattern; a display; an orientation sensor configured to detect an orientation; one or more touch sensors at the housing; a memory storing wrist neutral touch data associated with a wrist neutral grip corresponding to predetermined grip position locations at the touch sensor(s); and a controller configured to: when touch data received at the touch sensor(s) matches the wrist neutral touch data stored in the memory, control the aiming pattern of the data capture component according to the orientation detected by the orientation sensor; and when the touch data does not match the wrist neutral touch data, control a notification device to provide an indicator of the housing being out of the wrist neutral grip.

20 Claims, 19 Drawing Sheets

MOBILE DEVICE WITH WRIST NEUTRAL DATA CAPTURE

BACKGROUND

Workers in warehousing, transportation and logistics often use scanner equipped mobile devices to scan barcodes, and the like, on items at various heights and orientations, depending on where the items are placed. This could vary from scanning items on the floor (e.g. on pallets), to scanning items on shelf racks or shelf tags, to scanning smaller packages that could be hand held. Mobile devices with fixed angle scanners may induce uncomfortable and potentially stressful wrist deviations, for example, ulnar deviations towards the little finger. Such stressful wrist deviations may lead to fatigue in the workers due to: an increase in physical efforts to perform a scan, reduced strength over time, reduction in reserve capacity and increased recovery time, which may depend on environment and type and volume of scanning. In addition, scanning transaction verifications may compound such stressful wrist deviations since they are generally performed by a worker tilting their arm in order to bring a display of the mobile device to a suitable viewing angle. This may be an inefficient motion and further when performed repeatedly may again potentially cause physical stress.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate implementations of concepts described herein, and explain various principles and advantages of those implementations.

Figure 1:
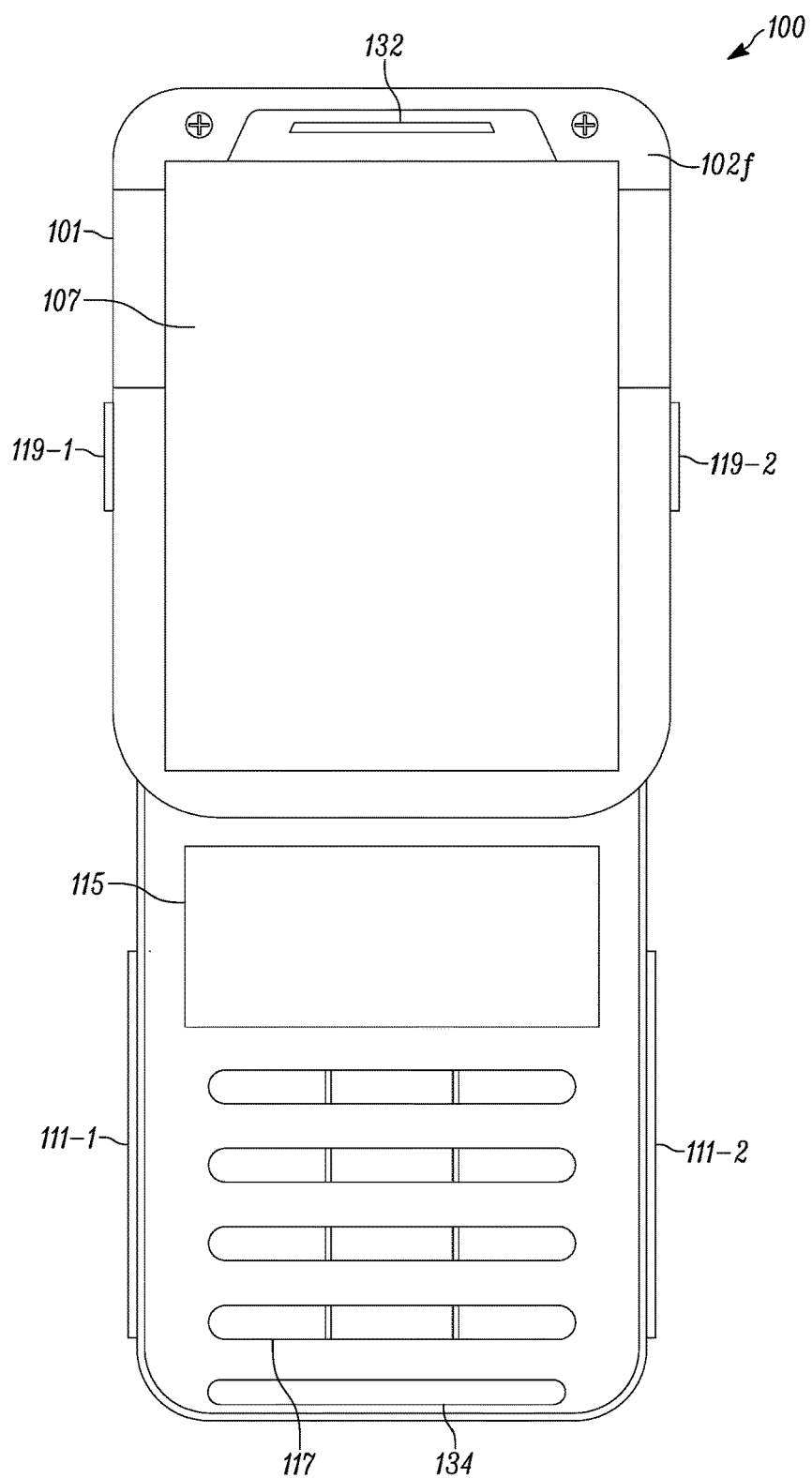
FIG. 1 depicts a front perspective view of a mobile device with wrist neutral data capture, according to non-limiting implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present specification.

The apparatus and method components have been represented where appropriate by conventional symbols in the drawings, showing only those specific details that are pertinent to understanding the implementations of the present specification so as not to obscure the disclosure with details that will be readily apparent to those of ordinary skill in the art having the benefit of the description herein.

DETAILED DESCRIPTION

An aspect of the specification provides a mobile device comprising: a housing having a front side and a rear side; a data capture component disposed on a rear side of the housing, the data capture component configured to change an aiming pattern; a display, disposed at the front side of the housing; an orientation sensor configured to detect an orientation of the housing; one or more touch sensors at the housing; a memory storing wrist neutral touch data associated with a wrist neutral grip corresponding to predetermined grip position locations at the one or more touch sensors; and a controller configured to: when touch data received at the one or more touch sensors matches the wrist neutral touch data stored in the memory, control the aiming pattern of the data capture component according to the orientation detected by the orientation sensor; and when the touch data does not match the wrist neutral touch data, control a notification device to provide an indicator of the housing being out of the wrist neutral grip.

The memory can further store aiming pattern data associated with one or more orientations, and the controller can be further configured to: when the touch data matches the wrist neutral touch data, control the aiming pattern of the data capture component according to the aiming pattern data associated with the orientation detected by the orientation sensor.

The controller can be further configured to enter a learning mode to determine the aiming pattern data for each of the one or more orientations.

The aiming pattern data associated with one or more orientations can comprise: a low aiming pattern data associated with a low orientation, a mid aiming pattern associate with a mid orientation, and a high aiming pattern data associated with a high orientation.

The controller can be further configured to enter a learning mode to: receive the wrist neutral touch data from the one or more touch sensors; and store the wrist neutral touch data in the memory.

The controller can be further configured to control the aiming pattern of the data capture component according to the orientation by changing the aiming pattern plus 10° or minus 10° from a baseline position.

The orientation can be defined with respect to the front side of the housing.

The data capture component can comprise one or more of a scanner and a camera.

The notification device can comprise one or more of the display, an aural notification device, a visual notification device and a haptic notification device.

The orientation sensor can comprise one or more of an accelerometer, a triaxial accelerometer, a 3-axis microelectromechanical system (MEMS) accelerometer, a three-dimensional orientation sensor, a magnetometer and a gyroscope.

Another aspect of the specification provides a method comprising: at device comprising: a housing having a front side and a rear side; a data capture component disposed on a rear side of the housing, the data capture component configured to change an aiming pattern; a display, disposed at the front side of the housing; an orientation sensor configured to detect an orientation of the housing; one or more touch sensors at the housing; a memory storing wrist neutral touch data associated with a wrist neutral grip corresponding to predetermined grip position locations at the one or more touch sensors; and a controller, when touch data received at the one or more touch sensors matches the wrist neutral touch data stored in the memory, controlling, using the controller, the aiming pattern of the data capture component according to the orientation detected by the orientation sensor; and when the touch data does not match the wrist neutral touch data, controlling, using the controller, a notification device to provide an indicator of the housing being out of the wrist neutral grip.

The memory can further store aiming pattern data associated with one or more orientations, and the method can further comprise: when the touch data matches the wrist neutral touch data, controlling the aiming pattern of the data capture component according to the aiming pattern data associated with the orientation detected by the orientation sensor.

The method can further comprise the controller entering a learning mode to determine the aiming pattern data for each of the one or more orientations.

The aiming pattern data associated with one or more orientations can comprise: a low aiming pattern data associated with a low orientation, a mid aiming pattern associate with a mid orientation, and a high aiming pattern data associated with a high orientation.

The method can further comprise the controller entering a learning mode to: receive the wrist neutral touch data from the one or more touch sensors; and store the wrist neutral touch data in the memory.

The method can further comprise controlling the aiming pattern of the data capture component according to the orientation by changing the aiming pattern plus 10° or minus 10° from a baseline position.

The orientation can be defined with respect to the front side of the housing.

The data capture component can comprise one or more of a scanner and a camera.

The notification device can comprise one or more of the display, an aural notification device, a visual notification device and a haptic notification device.

Another aspect of the specification provides a non-transitory computer-readable medium storing a computer program, wherein execution of the computer program is for: at device comprising: a housing having a front side and a rear side; a data capture component disposed on a rear side of the housing, the data capture component configured to change an aiming pattern; a display, disposed at the front side of the housing; an orientation sensor configured to detect an orientation of the housing; one or more touch sensors at the housing; a memory storing wrist neutral touch data associated with a wrist neutral grip corresponding to predetermined grip position locations at the one or more touch sensors; and a controller, when touch data received at the one or more touch sensors matches the wrist neutral touch data stored in the memory, controlling, using the controller, the aiming pattern of the data capture component according to the orientation detected by the orientation sensor; and when the touch data does not match the wrist neutral touch data, controlling, using the controller, a notification device to provide an indicator of the housing being out of the wrist neutral grip.

Attention is directed to FIG. 1, FIG. 2, FIG. 3 and FIG. 4 which respectively depict: a front perspective view of a mobile device 100 with wrist neutral data capture functionality (interchangeably referred to hereafter as device 100); a right-side perspective view of device 100; a rear perspective view of device 100; and a schematic diagram of device 100.

Device 100 comprises: a housing 101 having a front side 102f and a rear side 102r; a data capture component 105 disposed on rear side 102r, data capture component 105 configured to change an aiming pattern; a display 107, disposed at front side 102f; an orientation sensor 109 configured to detect an orientation of housing 101 (and/or device 100); one or more touch sensors 111-1, 111-2 at housing 101; a memory 122 storing wrist neutral touch data 223 associated with a wrist neutral grip corresponding to predetermined grip position locations at one or more touch sensors 111-1, 111-2; and a controller 120 configured to: when touch data received at one or more touch sensors 111-1, 111-2 matches wrist neutral touch data 223, control the aiming pattern of data capture component according to the orientation detected by orientation sensor 109; and when the touch data does not match wrist neutral touch data 223, control a notification device to provide an indicator of housing 101 being out of the wrist neutral grip. For example, controller 120 may control display 107 to provide an indicator of housing 101 being out of the wrist neutral grip and/or may control any other notification device at device 100 to provide an indicator of housing 101 being out of the wrist neutral grip. For example, one or more of an aural notification device, a visual notification device and a haptic notification device may be controlled to provide an indicator of housing 101 being out of the wrist neutral grip.

Figure 2:
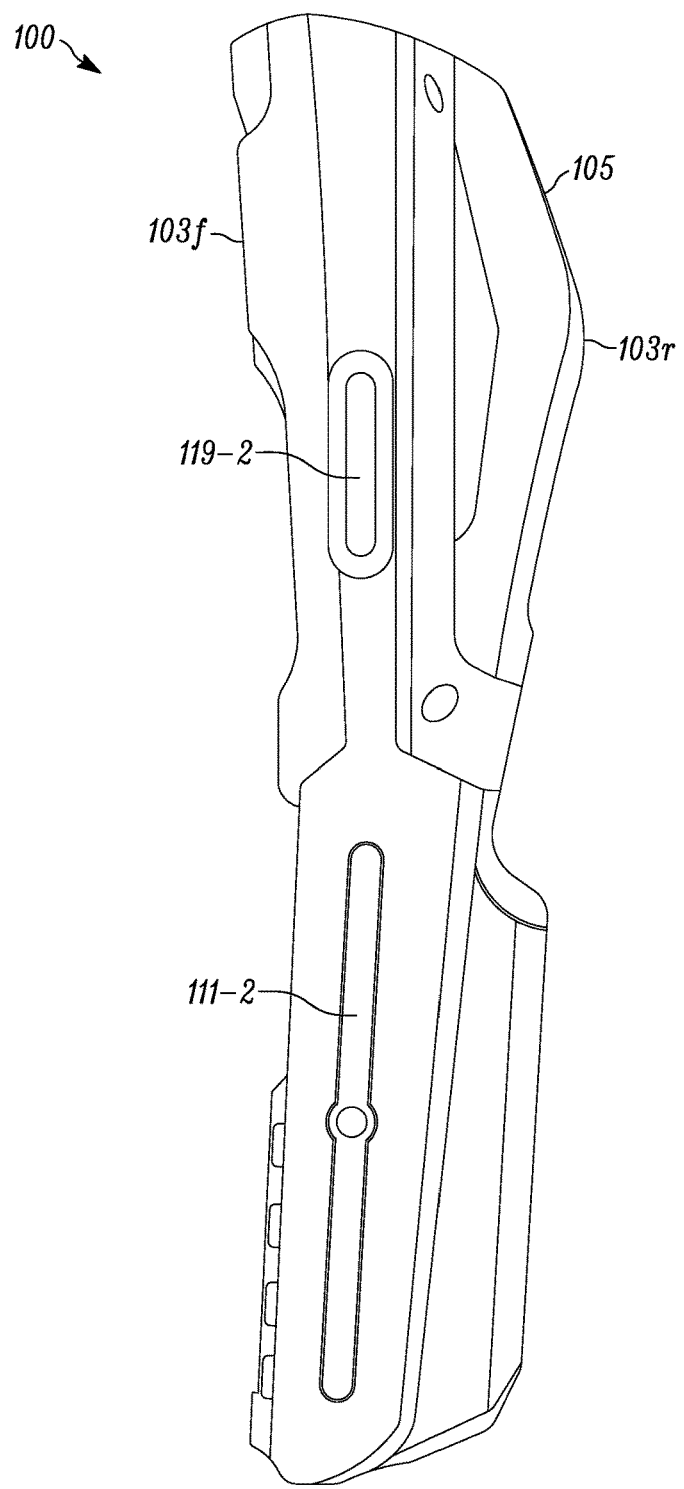
FIG. 2 depicts a side perspective view of the mobile device of FIG. 1, according to non-limiting implementations.
Figure 3:
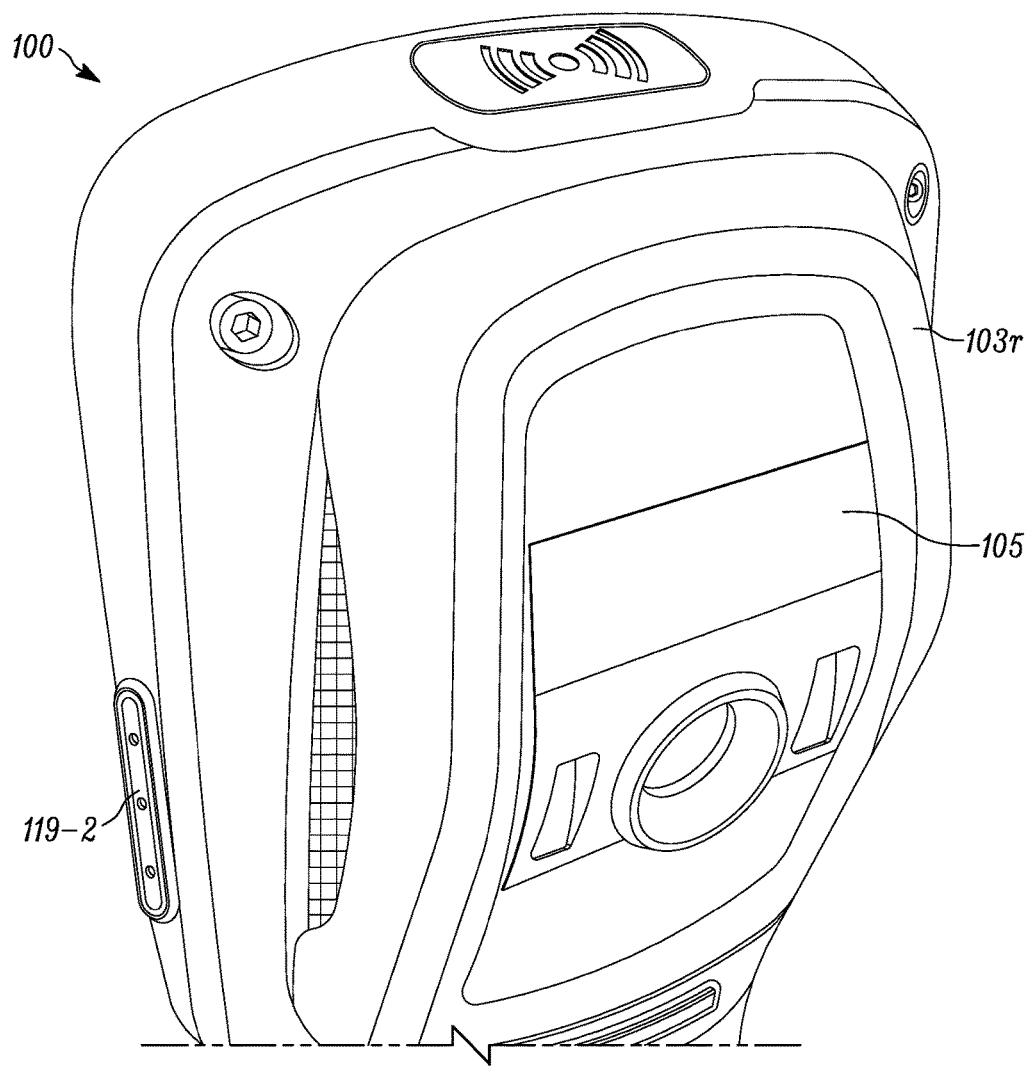
FIG. 3 depicts a rear perspective view of the mobile device of FIG. 1, according to non-limiting implementations.
Figure 4:
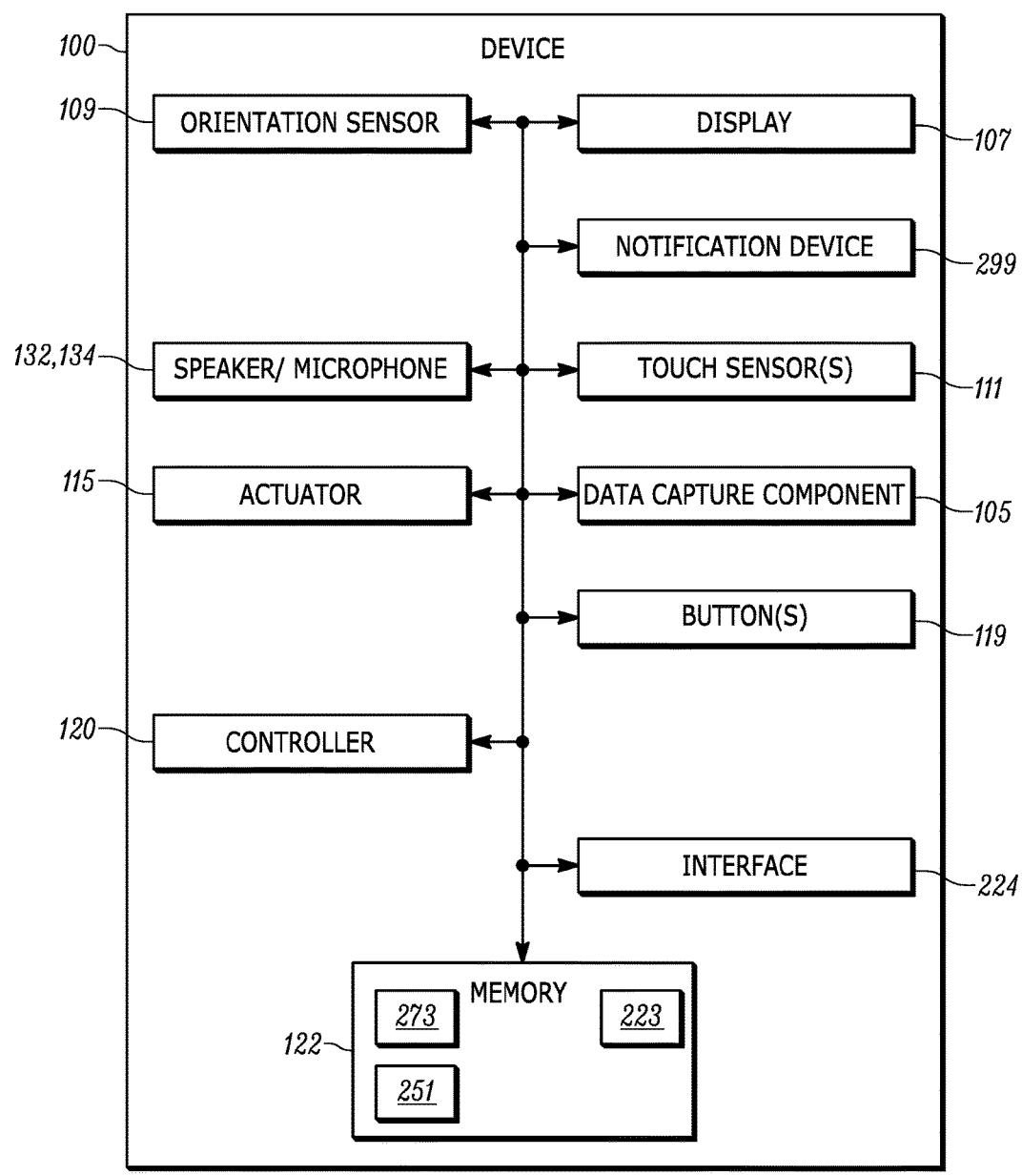
FIG. 4 depicts a schematic diagram of the mobile device of FIG. 1, according to non-limiting implementations.

With reference to FIG. 1, FIG. 2 and FIG. 3, device 100 further comprises a plurality of input devices including: a data capture component actuator 115, a keyboard 117, and one or more buttons 119-1, 119-2, all of which may be optional. With reference to FIG. 1, device 100 further comprises an optional speaker 132 and an optional microphone 134. With reference to FIG. 4, device 100 further comprises an optional communication interface 224, referred to hereafter as interface 224, and one or more notification devices 299 (which may include one or more of display 107 and speaker 132).

One or more touch sensors 111-1, 111-2 will be interchangeably referred to hereafter, collectively, as touch sensors 111 and, generically as a touch sensor 111; one or more buttons 119-1, 119-2 will be interchangeably referred to hereafter, collectively, as buttons 119 and, generically as a button 119. Data capture component actuator 115 will be interchangeably referred to hereafter as actuator 115.

In general, actuator 115 is configured to actuate data capture component 105. In other words, actuator 115 comprises a button, and the like which, when activated, causes data capture component 105 to capture data. Alternatively, data capture component 105 may be actuated using one or more buttons at keyboard 117, one or more of optional buttons 119, and/or at an optional digital button, and the like, rendered at display 107.

Data capture component 105 may comprise one or more of a scanner and/or a data scanner and a camera including, but not limited to, imagers and/or laser-based scanner data acquisition components. As depicted, data capture component 105 is located at rear side 102r of device and hence a pointing direction and/or field-of-view of data capture component 105 also extends from rear side 102r of device 100. Furthermore, a pointing direction and/or aiming pattern and/or field-of-view of data capture component 105 may be controllable. For example, data capture component 105 may comprise a laser scanner and a scanning angle of the laser scanner may be controllable using moveable mirrors, and/or other optical components. Similarly, data capture component 105 may comprise a camera with an external lens, with a pointing direction of at least the lens being moveable using motors, servo-motors, ultrasonic motors and the like. In any event, upon actuation of actuator 115, controller 120 may control a pointing direction and/or aiming pattern of data capture component 105 and control data capture component 105 to capture data.

Indeed, the terms pointing direction and aiming pattern may be interchangeable, though in general an aiming pattern may include, but is not limited to, a range of pointing directions and/or an angle through which data is captured by data capture component 105. For example, when data capture component 105 comprises a laser scanner, a laser pattern may be moved across a range of angles and capture data in laser light from barcodes, and the like, in the range of angles. Indeed, in these implementations, the pointing direction of the laser scanner is moved over the range of angles in an aiming pattern. Hence, controlling the aiming pattern may include, but is not limited to, controlling a range of angled over which data is captures by data capture component 105.

As best seen in FIG. 1, device 100 comprise two touch sensors 111, disposed on each side and/or edge of housing 101 that connect front side 102f to rear side 102r, and which are adjacent to keyboard 117 and/or actuator 115 (e.g. at a left edge and a right edge of housing 101). In particular, touch sensors 111 are located at positions of housing 101 where grip position locations at device 100 are detectable, and in particular touch sensors 111 are located where fingers and/or other parts of a hand gripping device 100 may be located. As depicted, each of touch sensors 111 comprise a pressure sensitive touch strip, each of which may further comprise a plurality of pressure sensors which may detect pressure at grip positions, as described in more detail below. Furthermore, as depicted touch sensors 111 on each of the left edge and right edge of housing 101 are integrated into the touch strip however, in other implementations, the touch sensors 111 may comprise a plurality of discrete touch sensors and/or pressure sensors at housing 101. Indeed, any type of touch sensors 111 are within the scope of present implementations including, but not limited to, capacitive touch sensors and/or resistive touch sensors.

Display 107 comprises any suitable one of, or combination of, flat panel displays (e.g. LCD (liquid crystal display), plasma displays, OLED (organic light emitting diode) displays), CRTs (cathode ray tubes) and the like, as well as one or more optional touch screens (including capacitive touchscreens and/or resistive touchscreens.

With reference to FIG. 4, orientation sensor 109 may comprise one or more of an accelerometer, a triaxial accelerometer a 3-axis microelectromechanical system (MEMS) accelerometer, a three-dimensional orientation sensor, a magnetometer and a gyroscope. In general, orientation sensor 109 may be configure to provide orientation data to controller 120 corresponding to an orientation of housing 101 and/or device 100 with respect to the ground and/or the earth, and/or an arbitrary position determined during a provisioning process. For example, in some implementations, such orientations may be defined with respect to front side 102f to determine when display 107 is in a position viewable to a user holding device 100, which may be combined with data from touch sensors 111 to further determine when device 100 is being held according to a wrist neutral grip, as described in more detail below.

Controller 120 is interconnected with memory 122, (storing wrist neutral touch data 223, application 251 and aiming pattern data 273), interface 224, data capture component 105, display 107, orientation sensor 109, touch sensors 111, actuator 115, optional buttons 119, speaker 132 and microphone 134, and notification device 299.

Notification device 299 may include one or more of display 107 and speaker 132, but may include any other visual notification device, aural notification device, and/or haptic notification device including, but not limited to, lights, light emitting diodes, other speakers, vibratory motors and the like.

While not depicted in FIG. 4, it is assumed that controller 120 is further interconnected any other electronic and/or communication components at device 100 which may include, but is not limited to, a radio frequency identification (RFID) device and/or reader, a Near Field Communication (NFC) device and/or reader, and the like, another camera device (e.g. not used as a scanner and/or or for warehousing applications), a PTT (push-to-talk) device and/or radio, and a messaging device (e.g. one or more radios and/or graphic user interfaces used to receive, compose and/or send messages, including, but not limited to, email, texts, SMS (short message services) messages, and the like.

Device 100 generally comprises a mobile device which may include, but is not limited to, any suitable combination of electronic devices, communications devices, computing devices, portable electronic devices, mobile computing devices, portable computing devices, tablet computing devices, telephones, PDAs (personal digital assistants), cellphones, smartphones, e-readers, mobile camera devices and the like, each of which comprises a data capture component. Other suitable devices are within the scope of present implementations. For example, while as depicted device 100 may be enabled as a mobile communication device with telephonic functionality, that is also enabled for data capture functionality using data capture component 105, device 100 need not comprise a mobile communication device, but rather may comprise a device specifically adapted for specialized functionality. For example, device 100 may be specifically adapted for warehouse inventory tracking and/or other data acquisition functionality using capture component 105 and may further include other types of hardware for warehouse inventory tracking and/or other data acquisition functionality, which may include, but is not limited to, one or more of a radio frequency identification (RFID) reader, a Near Field Communication (NFC) reader, and/or other types of data acquisition components. In yet further implementations, device 100 may be mountable in a vehicle. However, other devices are within the scope of present implementations.

With further reference to FIG. 4, controller 120 may comprise a processor and/or a plurality of processors, including but not limited to one or more central processors (CPUs) and/or one or more processing units; either way, controller 120 comprises a hardware element and/or a hardware processor. Indeed, in some implementations, controller 120 may comprise an ASIC (application-specific integrated circuit) and/or an FPGA (field-programmable gate array) specifically configured to implement at wrist neutral grip functionality of device 100 for scanning and/or data capture. In other words, controller 120 may be configured to determine whether device 100 is being held in a wrist neutral grip based on data from touch sensors 111 and, when so, control an aiming pattern of data capture component 105 according to an orientation sensed by orientation sensor 109; and further configured to, when device 100 is not being held in wrist neutral grip, control notification device 299 to provide an indicator thereof. Hence, device 100 is preferably not a generic computing device, but a device specifically configured to implement specific wrist neutral grip functionality and associated data capture functionality. For example, device 100 and/or controller 120 may specifically comprise a computer executable engine configured to implement specific wrist neutral grip functionality and associated data capture functionality.

Memory 122 may comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 100 as described herein are typically maintained, persistently, in memory 122 and used by controller 120 which makes appropriate utilization of volatile storage during the execution of such programming instructions. Those skilled in the art recognize that memory 122 is an example of computer readable media that may store programming instructions executable on controller 120. Furthermore, memory 122 is also an example of a memory unit and/or memory module and/or a non-volatile memory.

As depicted, memory 122 further stores application 251 that, when executed by controller 120, enables controller 120 to implement wrist neutral grip functionality and associated data capture functionality at device 100. In other words, as described in detail below, application 251 may be executed by controller 120 to: when touch data received at one or more touch sensors 111 matches wrist neutral touch data 223, control the aiming pattern of data capture component 105 according to the orientation detected by orientation sensor 109; and when the touch data does not match wrist neutral touch data 223, control notification device 299 to provide an indicator of housing 101 being out of the wrist neutral grip.

Application 251 may hence comprise an application which may be used to control data capture component 105 to capture, and optionally store, data, such as images, barcodes and the like. As such, application 251 may comprise a warehousing application and/or application 251 may be a module of a warehousing application.

As depicted, controller 120 also connects to interface 224, which may be implemented as one or more radios and/or connectors and/or network adaptors, configured to communicate wired and/or wirelessly with network architecture that is used to implement one or more communication links between other devices and/or a network, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, WLAN (wireless local area network) links, WiFi links, WiMax links, packet based links, the Internet, analog networks, the PSTN (public switched telephone network), access points, and the like, and/or a combination. However, interface 224 may be optional and device need not be configured to communicate with networks, though device 100 may be generally configured to convey data to other devices, for example using wired and/or wireless connections, and the like, with the other devices.

Controller 120 be further configured to communicate with other and/or optional input devices (not depicted) of device 100, which, when present, may be configured to receive input data including, but not limited to, any suitable combination of a keypad, a pointing device, a mouse, a track wheel, a trackball, a touchpad and the like. Other suitable input devices are within the scope of present implementations. Indeed, device 100 may comprise a touch screen of display 107 which may generally be used as an input device to control other functionality at device 100, for example, using graphic user interfaces, digital buttons, pull down menus, and the like.

While not depicted, device 100 further comprises a power supply, including, but not limited to, a connection to a mains power supply and/or a power adaptor (e.g. an AC-to-DC (alternating current to direct current) adaptor), and alternatively a battery, a power pack and the like. In general, such a power supply powers components of device 100.

Hence, it should be understood that in general a wide variety of configurations for device 100 are contemplated and device 100 may include other components related, for example to telephony, messaging, entertainment, and/or any other components that may be used with a mobile device.

Figure 5:
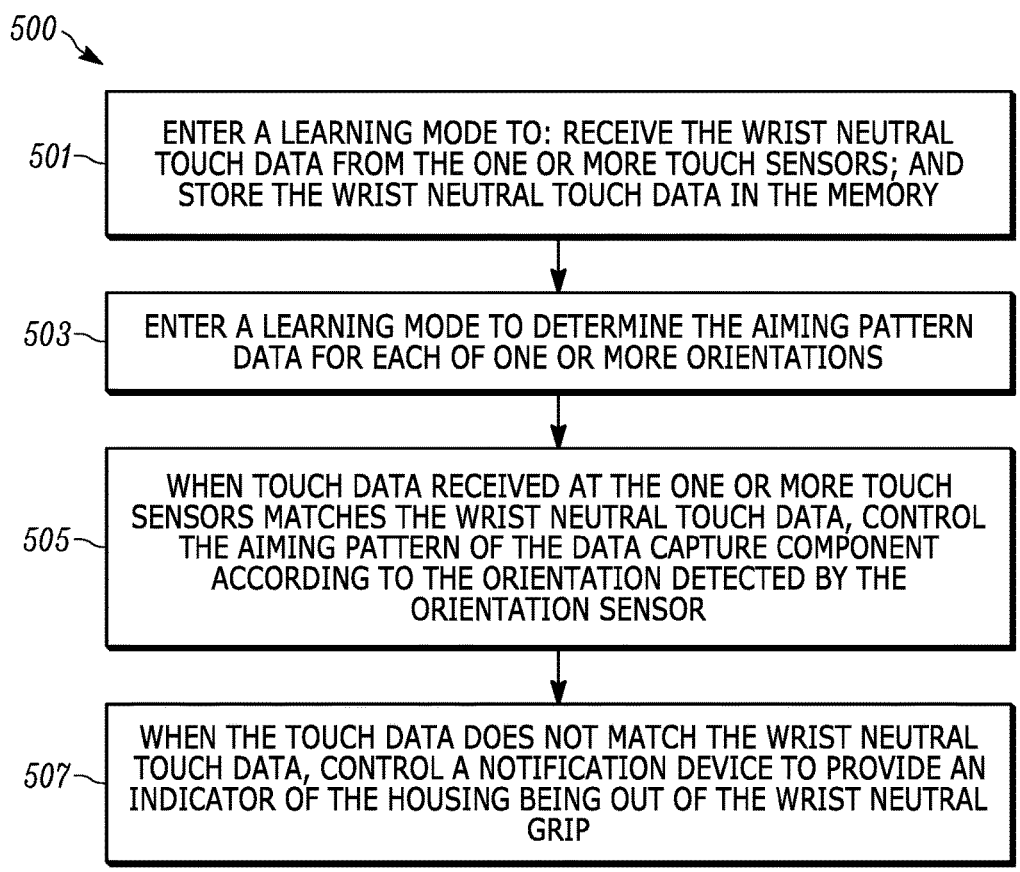
FIG. 5 depicts a block diagram of a flowchart of a method for wrist neutral data capture, according to non-limiting implementations.

Attention is now directed to FIG. 5 which depicts a block diagram of a flowchart of a method 500 for providing wrist neutral grip functionality and associated data capture functionality. In order to assist in the explanation of method 500, it will be assumed that method 500 is performed using device 100, and specifically by controller 120 at device 100, when controller 120 executes instructions stored at memory 122, for example application 251. Indeed, method 500 is one way in which device 100 may be configured. Furthermore, the following discussion of method 500 will lead to a further understanding of device 100, and its various components. However, it is to be understood that device 100 and/or method 500 may be varied, and need not work exactly as discussed herein in conjunction with each other, and that such variations are within the scope of present implementations.

Regardless, it is to be emphasized, that method 500 need not be performed in the exact sequence as shown, unless otherwise indicated; and likewise, various blocks may be performed in parallel rather than in sequence; hence the elements of method 500 are referred to herein as "blocks" rather than "steps". It is also to be understood, however, that method 500 may be implemented on variations of device 100 as well.

At an optional block 501, controller 120 enters a learning mode to: receive wrist neutral touch data 223 from one or more touch sensors 111; and store wrist neutral touch data 223 in memory 122.

At an optional block 503, controller 120 enters a learning mode to: determine aiming pattern data 273 for each of one or more orientations.

At block 503, controller 120, when touch data received at one or more touch sensors 111 matches wrist neutral touch data 223, controls the aiming pattern of data capture component 105 according to the orientation detected by orientation sensor 109.

At block 507, controller 120, when the touch data does not match wrist neutral touch data 223, control notification device 299 to provide an indicator of housing 101 being out of the wrist neutral grip.

It is appreciated that each of blocks 501, 503 may be optional and/or may be implemented in any order. Furthermore, block 507 may be implemented independent of and/or in parallel with blocks 503, 505.

Method 500 will now be described with reference to FIG. 6 to FIG. 19.

Figure 6:
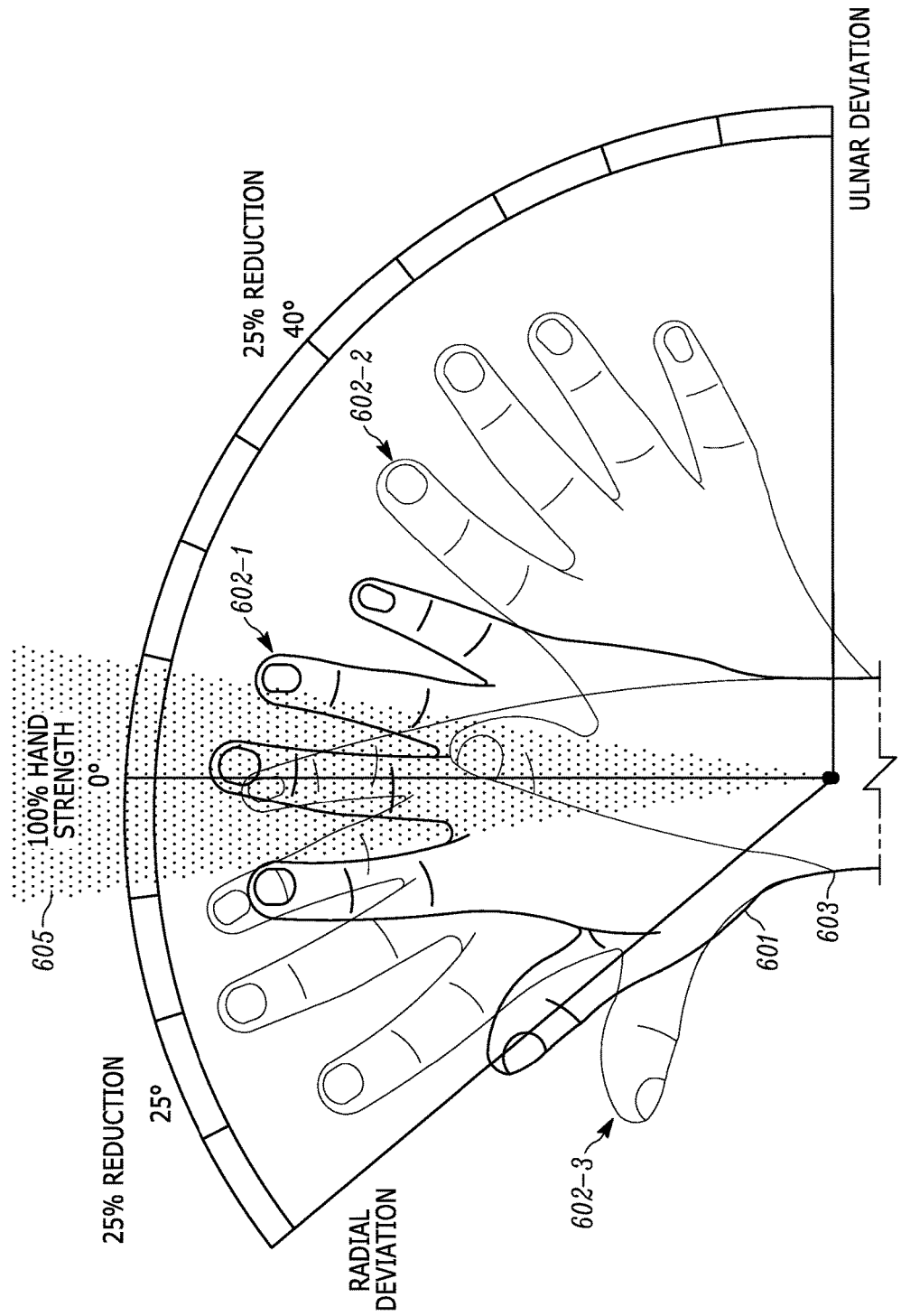
FIG. 6 depicts an illustration of angles through which a wrist may deviate, according to non-limiting implementations.

Attention is next directed to FIG. 6, which depicts an illustration of angles through which a wrist may deviate (e.g. from side-to-side). In particular, FIG. 6 depicts a hand 601 in three positions 602-1, 602-2, 602-3 with respect to a wrist 603. At position 602-1, hand 601 is extended straight from wrist 603 is at a 0° angle from wrist 603; as understood from ergonomics, at the 0° angle, hand 601 is able to exert 100% of strength to an object being held by hand 601. Furthermore, such 100% hand strength may be maintained over a range of about +/−10° from 0°, as indicated by triangle 605; such a range may be determined from ergonomics, and the like.

As also depicted in in FIG. 6, hand 601 may move to position 602-2, by bending hand 601 at wrist 603 in a direction of the little finger of hand 601 (e.g. the little finger moves towards wrist 603, which is known as an ulnar deviation). Such an ulnar deviation may cause a reduction of 25% hand strength, for example at ulnar deviation angles of around 40°.

Similarly, as also depicted in FIG. 6, hand 601 may move to position 602-3, by bending hand 601 at wrist 603 in a direction of the thumb finger of hand 601 (e.g. the thumb moves towards wrist 603, which is known as a radial deviation). Such a radial deviation may cause a reduction of 25% hand strength, for example at radial deviation angles of around 25°. Hence, ideally, hand 601 is held at position 602-1 when performing work, such as performing data capture using device 100 held by hand 601.

Figure 7:
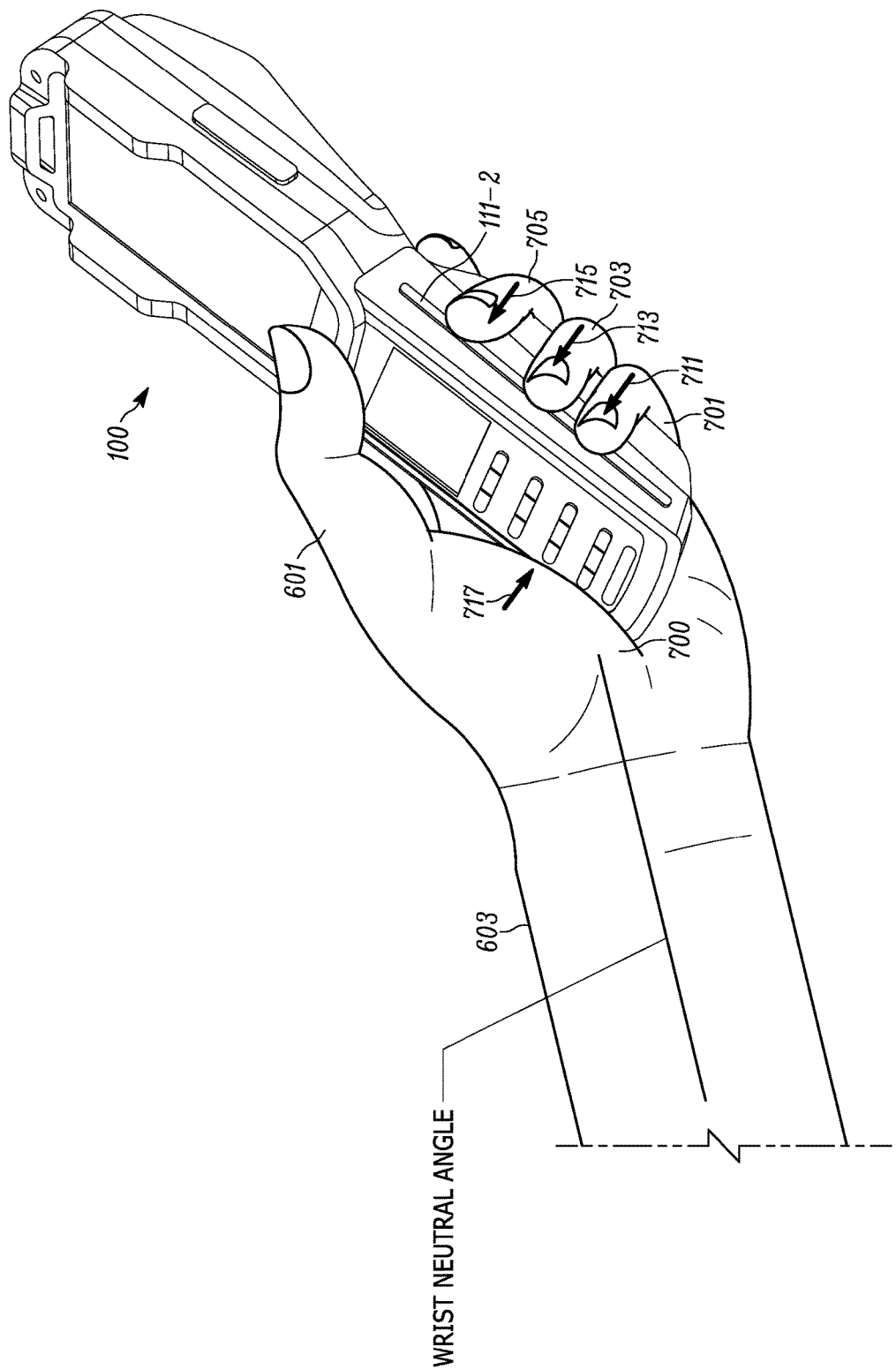
FIG. 7 depicts the mobile device of FIG. 1 being held in a wrist neutral position, according to non-limiting implementations.

Indeed, attention is next directed to FIG. 7 which depicts device 100 being held in a wrist neutral grip by hand 601; specifically, hand 601 is at 0° to wrist 603. Furthermore, fingers of hand 601 and palm 700 of hand 601 are in contact with touch sensors 111 in particular grip position locations. Touch sensors 111 may be configured to detect both a grip position location of hand parts (e.g. fingers of a hand, a palm of a hand and the like) in contact with touch sensors 111, and a pressure applied to touch sensors 111 at each grip position location.

For example, pinky 701, ring finger 703 and middle finger 705 of hand 601 are in contact with touch sensor 111-2 at particular grip position locations, and touch sensor 111-2 may produce touch data indicating a grip position location of each; similarly, while touch sensor 111-1 is not visible in FIG. 7, palm 700 of hand 601 is in contact with touch sensor 111-1 and touch sensor 111-1 may produce touch data indicating a grip position location (and/or an average position and/or a range of positions) of palm 700. Hence, each of pinky 701, ring finger 703 and middle finger 705 are applying pressure to touch sensor 111-2 at the grip position locations, the pressure of each indicated, respectively, by arrows 711, 713, 715 at the grip. Furthermore, as indicated by arrow 717, palm 700 of hand 601 is applying pressure to touch sensor 111-1. Hence, touch data sensed by touch sensors 111 in the grip position of hand 601 depicted in FIG. 7 may correspond to wrist neutral touch data 223.

In addition, in FIG. 7, it is understood that an index finger of hand 601 is not touching either of touch sensors 111. Indeed, in a wrist neutral grip, not all of fingers need touch a touch sensor 111; however, touch sensors 111 are generally located such that a portion of hand 601 interacts touch sensors 111 when device 100 is being held at least in a wrist neutral grip. The exact portions of hand 601 that interact with touch sensors 111, however, may change from user to user.

Furthermore, touch sensors 111 may be located at positions other than a left edge and right edge of housing 101, as long as touch sensors 111 may detect positions and/or pressure of at least a portion of a hand gripping device 100. For example, touch sensors 111 may be located in any region of housing 101 where hand grips device 100 including, but not limited to, rear side 102r of housing 101 and front side 102f of housing 101.

In some implementations, wrist neutral touch data 223 may be provisioned at memory 122 when application 251 is provisioned at memory 122. For example, from human factors studies, and the like, average grip position locations and/or average pressures at touch sensors 111 while a human hand is gripping device 100 in a wrist neutral position may be determined heuristically and stored at memory 122. Furthermore, such heuristically determined wrist neutral touch data 223 may be provided for each of left-hand users and right-handed users, and controller 120 may provide an option for device 100 to be operated in a left-handed mode or a right-handed mode, with heuristically determined wrist neutral touch data 223 selected accordingly, for example using pull down menus, graphic user interfaces (GUI) and the like.

Figure 8:
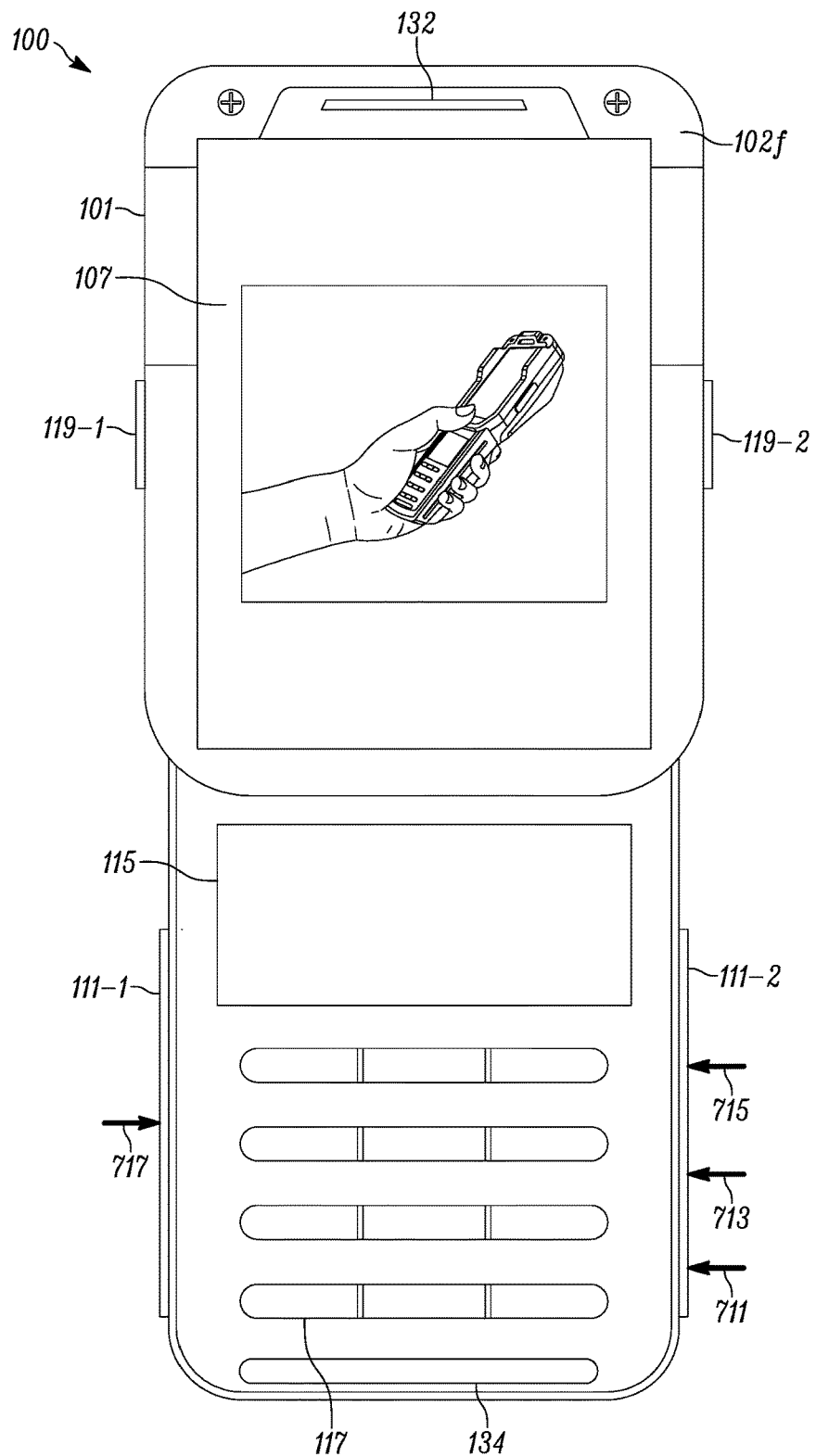
FIG. 8 depicts the mobile device of FIG. 1 in a learning mode to provision wrist neutral touch data, according to non-limiting implementations.
Figure 9:
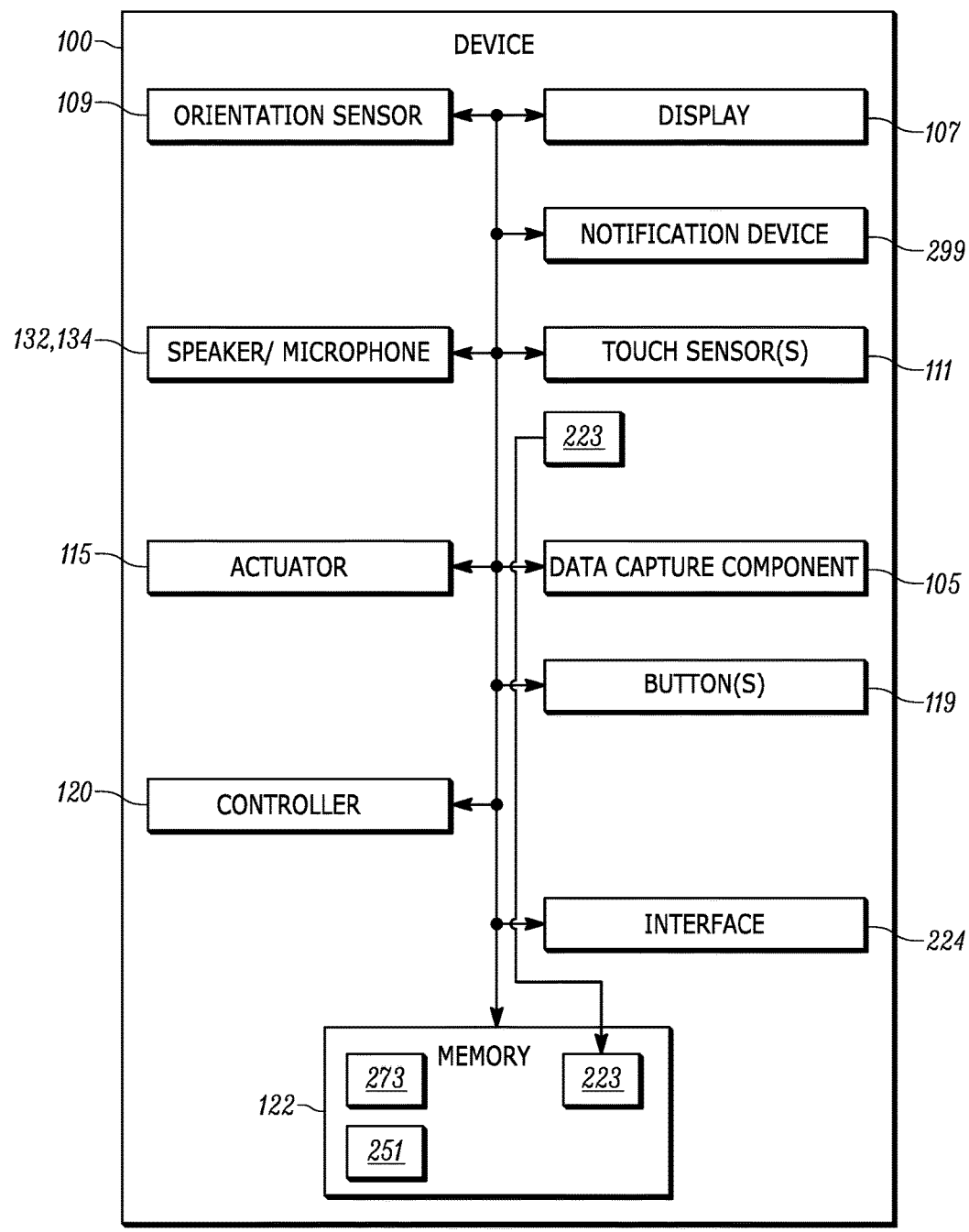
FIG. 9 depicts the mobile device of FIG. 1 storing wrist neutral touch data sensed at touch sensors in a memory, according to non-limiting implementations.

Alternatively, wrist neutral touch data 223 may be provisioned at device 100 by causing device 100 to enter a learning mode (e.g. at block 501 of method 500). For example, attention is directed to FIG. 8 and FIG. 9, (which are substantially similar, respectfully, to FIG. 1 and FIG. 4, with like elements having like numbers) in which device 100 has been controlled to enter a learning mode, for example, using pull down menus, GUIs and the like. In the learning mode, as depicted in FIG. 8, controller 120 controls display 107 to render instructions for holding device 100 in a wrist neutral grip, as well as instructions for capturing wrist neutral touch data 223 once device 100 is being held in a wrist neutral grip. In particular, FIG. 8 depicts arrows 711, 713, 715, 717 being applied at particular grip position locations at touch sensors 111, indicting both a position and pressure of parts of a hand interacting with touch sensors 111 in a wrist neutral grip (e.g. as in FIG. 7). Once the wrist neutral grip is achieved, actuator 115 may be actuated and, as depicted in FIG. 9, controller 120 may cause wrist neutral touch data 223 to be captured at touch sensors 111 and stored at memory 122.

Indeed, wrist neutral touch data 223 may be particular for a given user. For example, a first user may have all four fingers interacting with touch sensors 111 in a wrist neutral position, while a second user may have only their pinky interacting with touch sensors 111 in a wrist neutral position. Furthermore, wrist neutral touch data 223 is generally different for right-handed users and left-hand users. The learning mode depicted in FIG. 8 and FIG. 9 may enable wrist neutral touch data 223 to be customized and/or provisioned for a particular user. Hence, controller 120 may be further configured to enter a learning mode to: receive wrist neutral touch data 223 from one or more touch sensors 111; and store wrist neutral touch data 223 in memory 122.

Indeed, once wrist neutral touch data 223 has been determined using the learning mode, such wrist neutral touch data 223 may be stored at memory 122 association with user credentials and/or transmitted to a server with the user credentials, and the like, in a cloud-based environment (e.g. using interface 224) for storage in association with the user credentials. Each time the associated user credentials are used to log-in to device, the wrist neutral touch data 223 may be provisioned to device 100 from the server (again using interface 224) and/or used to determine a wrist neutral grip at device 100.

Furthermore, controller 120 may receive touch data from touch sensors 111 and compare such touch data to wrist neutral touch data 223 to determine whether device 100 is being held in a wrist neutral grip, or whether device 100 is not being held in wrist neutral grip (e.g. at block 507 of method 500).

Figure 10:
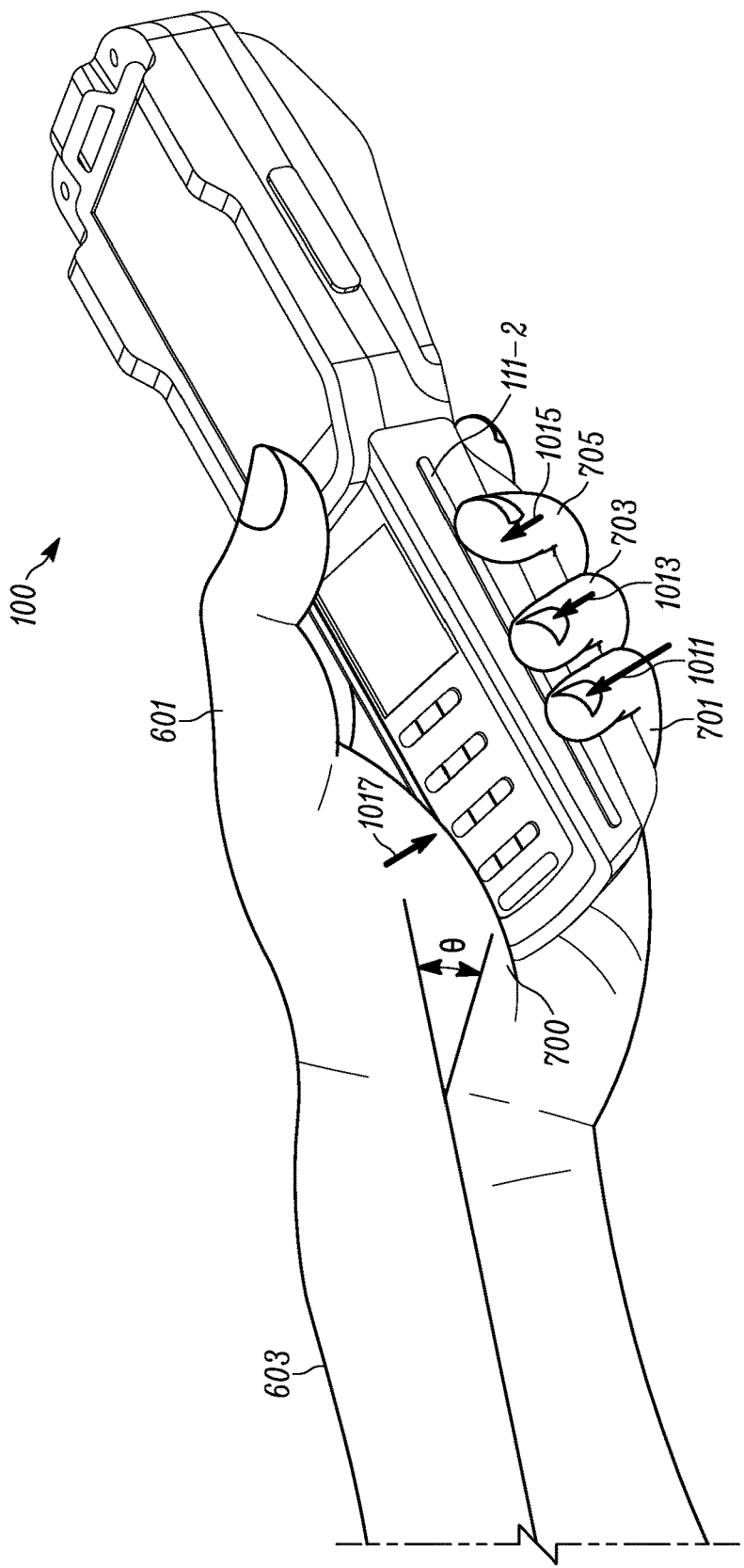
FIG. 10 depicts the mobile device of FIG. 1 being held out of a wrist neutral position, and specifically in an ulnar deviation according to non-limiting implementations.

For example, attention is next directed to FIG. 10 which depicts hand 601 holding device 100 out of a wrist neutral grip; in particular, hand 601 is in an ulnar deviation position such that hand 601 is at an angle θ to wrist 603. As such, grip position locations and/or pressure of each of palm 700, pinky 701, ring finger 703 and middle finger 705 at touch sensors 111 may change relative to that depicted in FIG. 7, as indicated respectively by arrows 1017, 1011, 1013, 1015. In particular, arrows 1017, 1011, 1013, 1015 indicate different positions and/or pressures than positions and/or pressures indicated by arrows 717, 711, 713, 715 of FIG. 7. For example, in such an ulnar deviation, pressure at touch sensor 111-2 exerted by pinky 701 may increase, and pressure at touch sensors 111 exerted by palm 700 and fingers 703, 705 may also change. Such changes may depend on a user; however, such changes generally cause touch data sensed at touch sensors 111 to be different from wrist neutral touch data 223.

Figure 11:
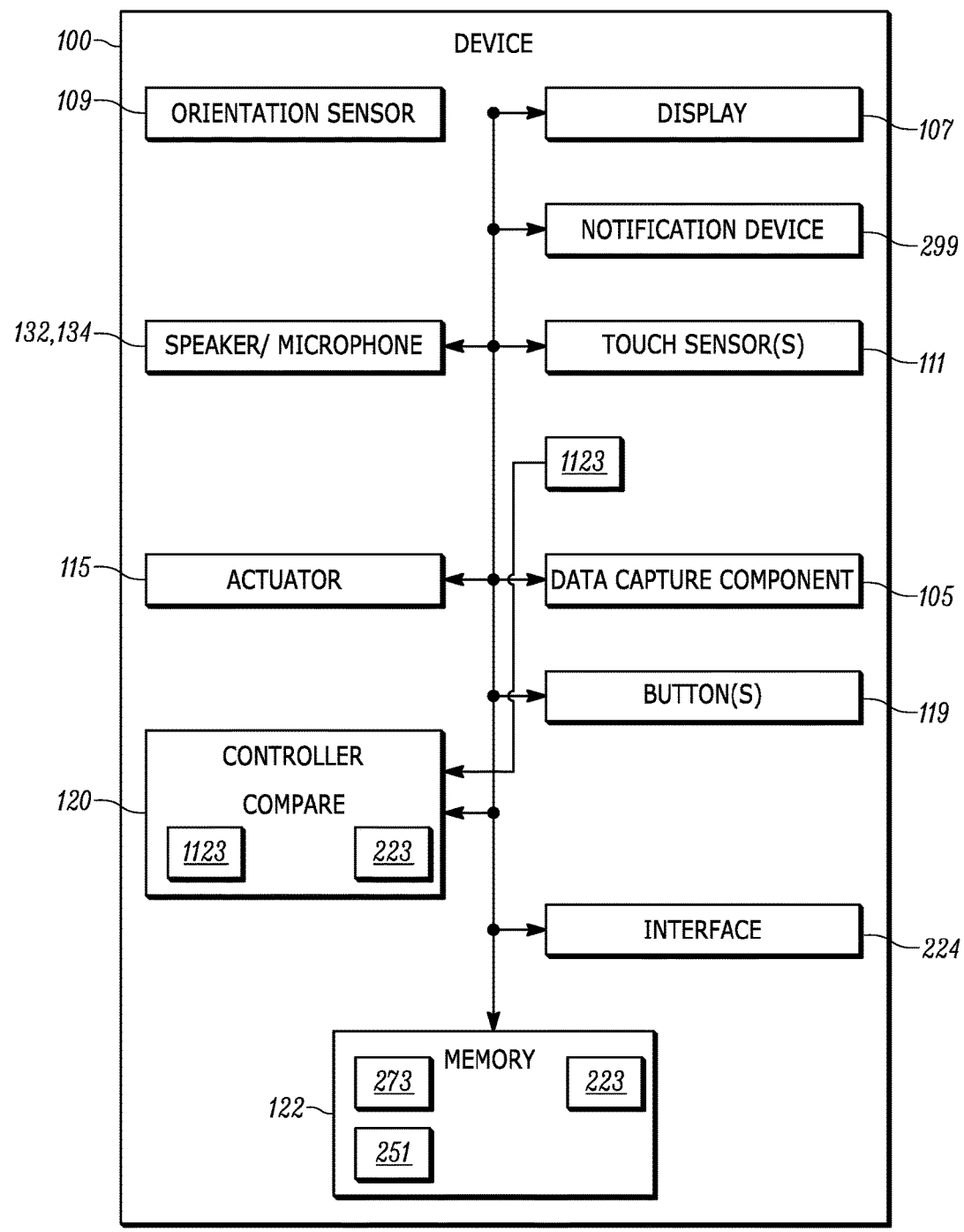
FIG. 11 depicts the mobile device of FIG. 1 comparing touch data, sensed at touch sensors, with wrist neutral touch data, according to non-limiting implementations.

As such, with reference to FIG. 11 (which is substantially similar to FIG. 4, with like elements having like numbers), controller 120 may receive touch data 1123 corresponding to positions and/or pressures indicated by arrows 1017, 1011, 1013, 1015 and compare touch data 1123 with wrist neutral touch data 223, for example on an ongoing basis and/or periodically. In other words, controller 120 monitors touch data from touch sensors 111.

A non-limiting implementation of block 507 of method 500 is now described, prior to describing blocks 503, 505, as block 507 may be implemented in association with and/or in parallel with blocks 503, 505.

Figure 12:
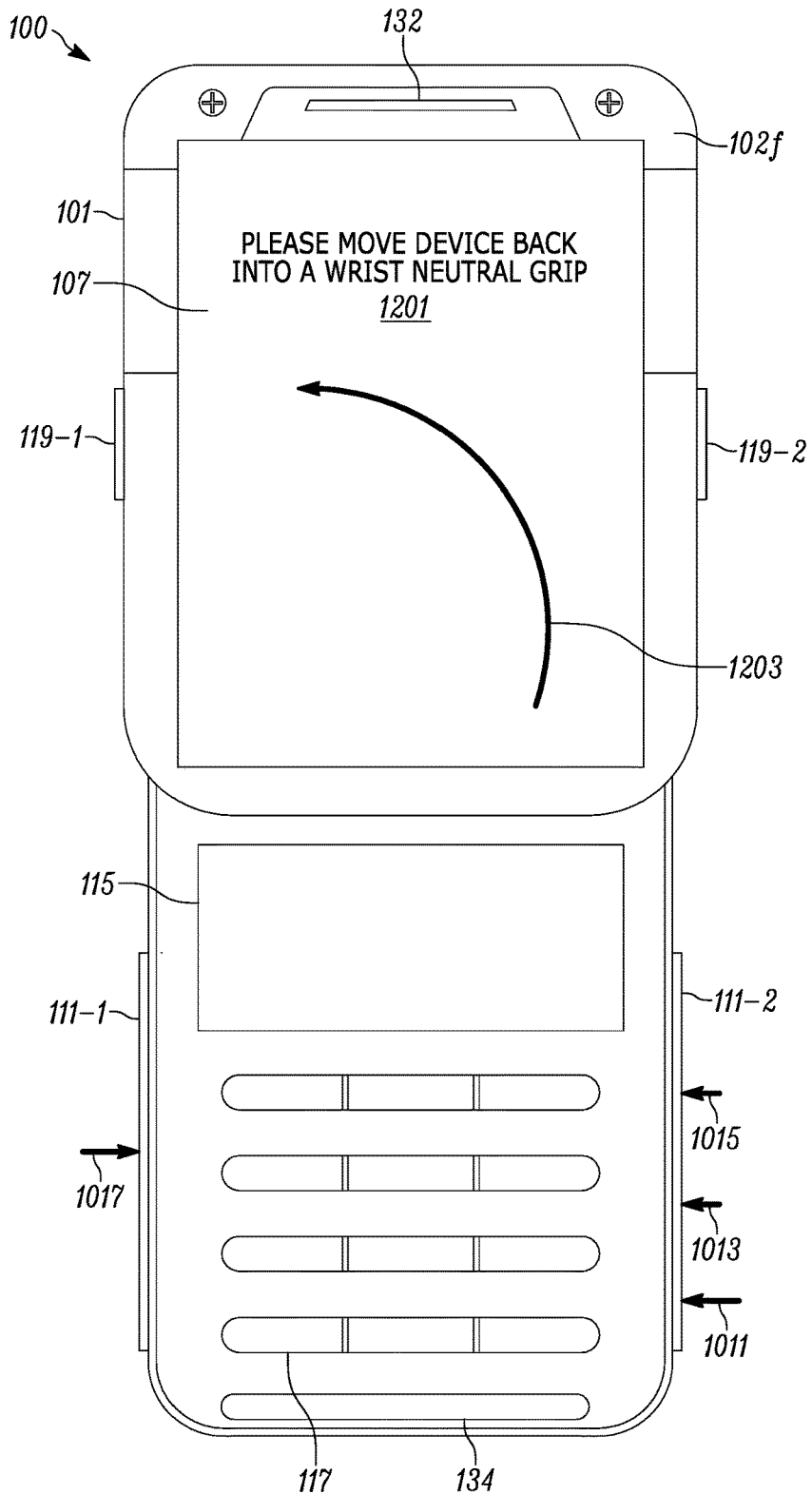
FIG. 12 depicts the mobile device of FIG. 1 providing an indicator to move the mobile device back into a wrist neutral position, according to non-limiting implementations.

In any event, when touch data 1123 does not match wrist neutral touch data 223 (e.g. at block 507), and with reference to FIG. 12 (which is substantially similar to FIG. 1, with like elements having like numbers), controller 120 controls (e.g. at block 507) notification device 299, and in particular display 107, to provide an indicator 1201 of housing 101 and/or device 100 being out of the wrist neutral grip.

Figure 13:
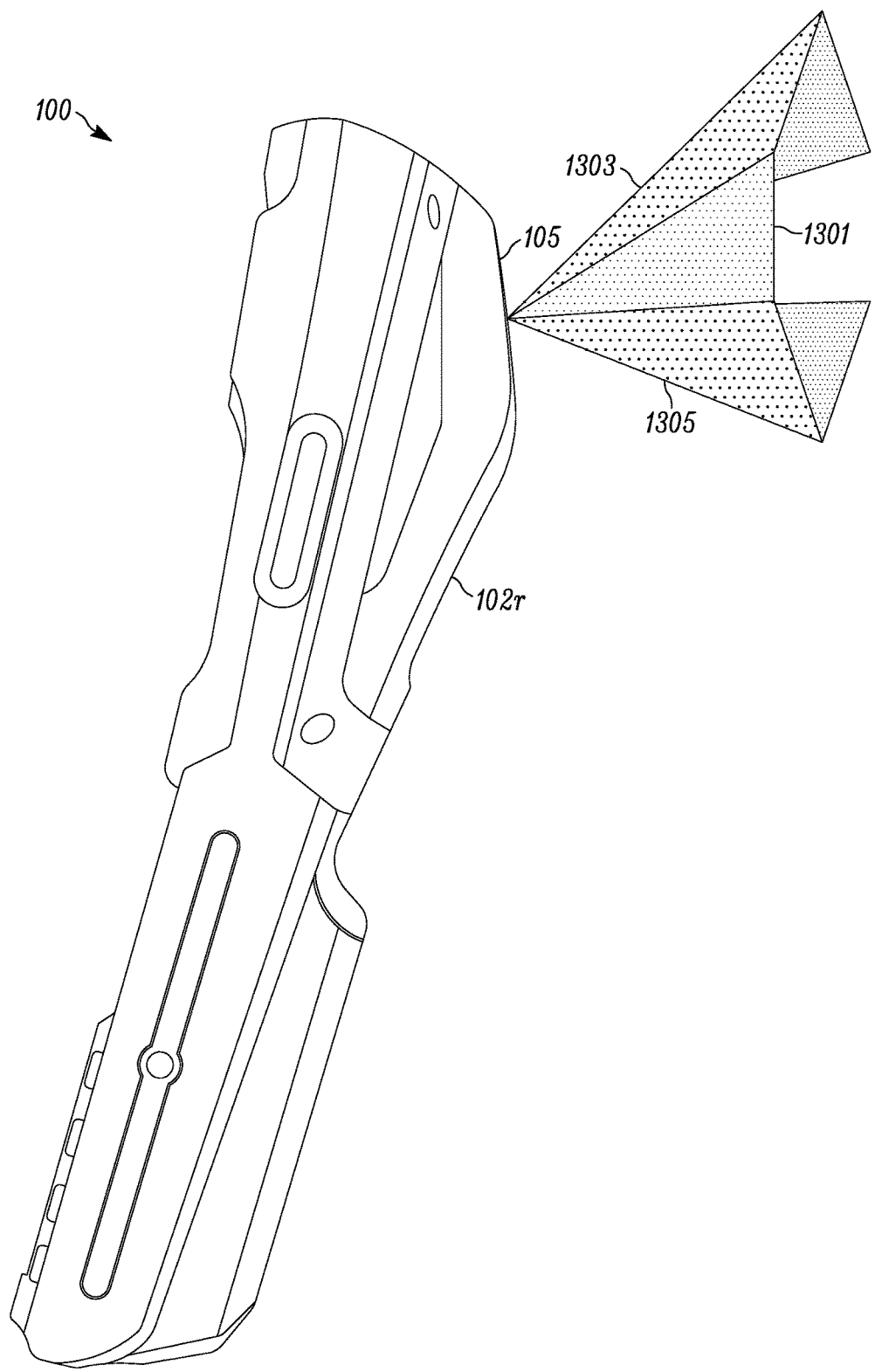
FIG. 13 depicts a range of aiming patterns of the mobile device of FIG. 1, according to non-limiting implementations.

For example, as depicted in FIG. 13, controller 120 may control display 107 to render instructions to move device 100 back into a wrist neutral grip. In depicted implementations, such instructions may include an arrow 1203 which indicates a direction to move device 100 back into the wrist neutral grip; a direction of arrow 1203 may be based on touch data 1123. For example, when pressure due to pinky 701 increases with respect to wrist neutral touch data 223, controller 120 may determine that device 100 has undergone an ulnar deviation and provides instructions to move device 100 way from the ulnar deviation (as depicted); similarly, when pressure due to pinky 701 decreases with respect to wrist neutral touch data 223, controller 120 may determine that device 100 has undergone a radial deviation and provides instructions to move device 100 way from the radial deviation. However, such an increase and decrease in pressure of pinky 701 and/or other fingers may depend on a user; indeed, in the learning mode depicted in FIG. 8 and FIG. 9, controller 120 may instruct the user to move device 100 into an ulnar deviation and/or a radial deviation, collect and store associated ulnar deviation touch data and/or radial deviation touch data, and compare touch data 1123 to each to determine a direction of movement in which device 100 is to be positioned to bring device 100 back into a wrist neutral position.

Indeed, FIG. 10, FIG. 11 and FIG. 12 illustrate that block 507 of method 500 may be performed independent of the remaining blocks of method 500.

Furthermore, in other implementations, an indication of housing 101 and/or device 100 being out of a wrist neutral grip may be provided using other types of notification devices, including, but not limited to, speaker 132 (e.g. an audio message and/or alert may be provided indicating that housing 101 and/or device 100 is out of a wrist neutral grip) and/or any other notification device, including, but not limited to, lights, light emitting diodes, haptic devices, and the like. For example, when touch data 1123 does not match wrist neutral touch data 223, controller 120 may control a light and/or a light emitting diode to blink and/or change color, and/or control a vibratory motor to vibrate, for example according to a given pattern.

Attention is next directed to FIG. 13 which depicts various aiming pattern and/or aiming pattern positions and/or point directions of data capture component 105 of device 100. In particular, a baseline position 1301 of aiming pattern of data capture component 105 may include a pointing direction and/or field-of-view of a camera, an angular range over which a laser scanner may scan, and the like. Baseline position 1301 may comprise a central position of data capture component 105. As depicted, baseline position 1301 extends from rear side 102r at a given angle, which may be determined both by a location of data capture component 105 in housing 101 and a shape of housing 101. Indeed, baseline position 1301 may be located and/or selected such that data capture, by data capture component 105, may occur at rear side 102r of device 100 when device 100 is being held about 45° to the earth and/or the ground, as depicted. However, baseline position 1301 may generally be selected based on ergonomics and/or human factor studies and/or heuristically.

FIG. 13 further depicts deviations 1303, 1305 from baseline position 1301 of the aiming pattern; for example, each of deviations 1303, 1305 indicate that an aiming pattern and/or a pointing direction may be changed plus 10° and/or minus 10° from baseline position 1301. In other words, in some implementations, an aiming pattern and/or a pointing direction of data capture component 105 may be steered +/−10° from baseline position 1301. However, other aiming patterns and/or pointing directions and/or baseline positions, and/or deviations from baseline positions, are within the scope of present implementations.

In particular, controller 120 is generally configured to control the aiming pattern of data capture component 105 according to an orientation detected by orientation sensor 109 (e.g. at block 505 of method 500), as described hereafter, assuming that device 100 is being held in a wrist neutral position as described above.

In some implementations, aiming pattern data 273 for controlling the aiming pattern of data capture component 105 may be provisioned at memory 122 when application 251 is provisioned at memory 122. For example, from human factors studies, and the like, average aiming patterns of data capture component 105 may be determined heuristically for one or more orientations of housing 101 and/or device 100 while a human hand is gripping device 100 in a wrist neutral position, and stored at memory 122. Furthermore, such heuristically determined aiming pattern data 273 may be provided for each of left-hand users and right-handed users, and controller 120 may provide an option for device 100 to be operated in a left-handed mode or a right-handed mode, with heuristically determined aiming pattern data 273 selected accordingly. For example, a direction of baseline position 1301 may be different for each of left-hand users and right-handed users.

Similarly, heuristically determined aiming pattern data 273 may be determined for each of a plurality of orientations. For example, a first orientation may correspond to a low orientation, where device 100 is generally aimed "downward"; a second orientation may correspond to a mid orientation, where device 100 is generally aimed directly away from a user holding device 100 (e.g. as depicted in FIG. 13); and a third orientation may correspond to a high orientation, where device 100 is generally aimed "upward". While each of these orientations are described in relative terms, each may be associated with a respective angle, a respective range of angles and/or a respective set of orientation data detected by orientation sensor 109, which may be determined and/or measured when the heuristically determined aiming pattern data 273 is being generated. Alternatively, each of these orientations may be associated with predetermined angles and/or predetermined ranges of angles and/or predetermined sets of orientation data which may also be heuristically determined.

For example, aiming pattern data 273 may alternatively be provisioned at device 100 by causing device 100 to enter a learning mode (e.g. at block 503 of method 500). For example, attention is directed to FIG. 14, FIG. 15 and FIG. 16, (FIG. 14 and FIG. 15 being substantially similar to FIG. 1 and FIG. 16 being substantially similar to FIG. 4, with like elements having like numbers) in which device 100 has been controlled to enter an aiming pattern learning mode, for example, using pull down menus, GUIs and the like.

Figure 14:
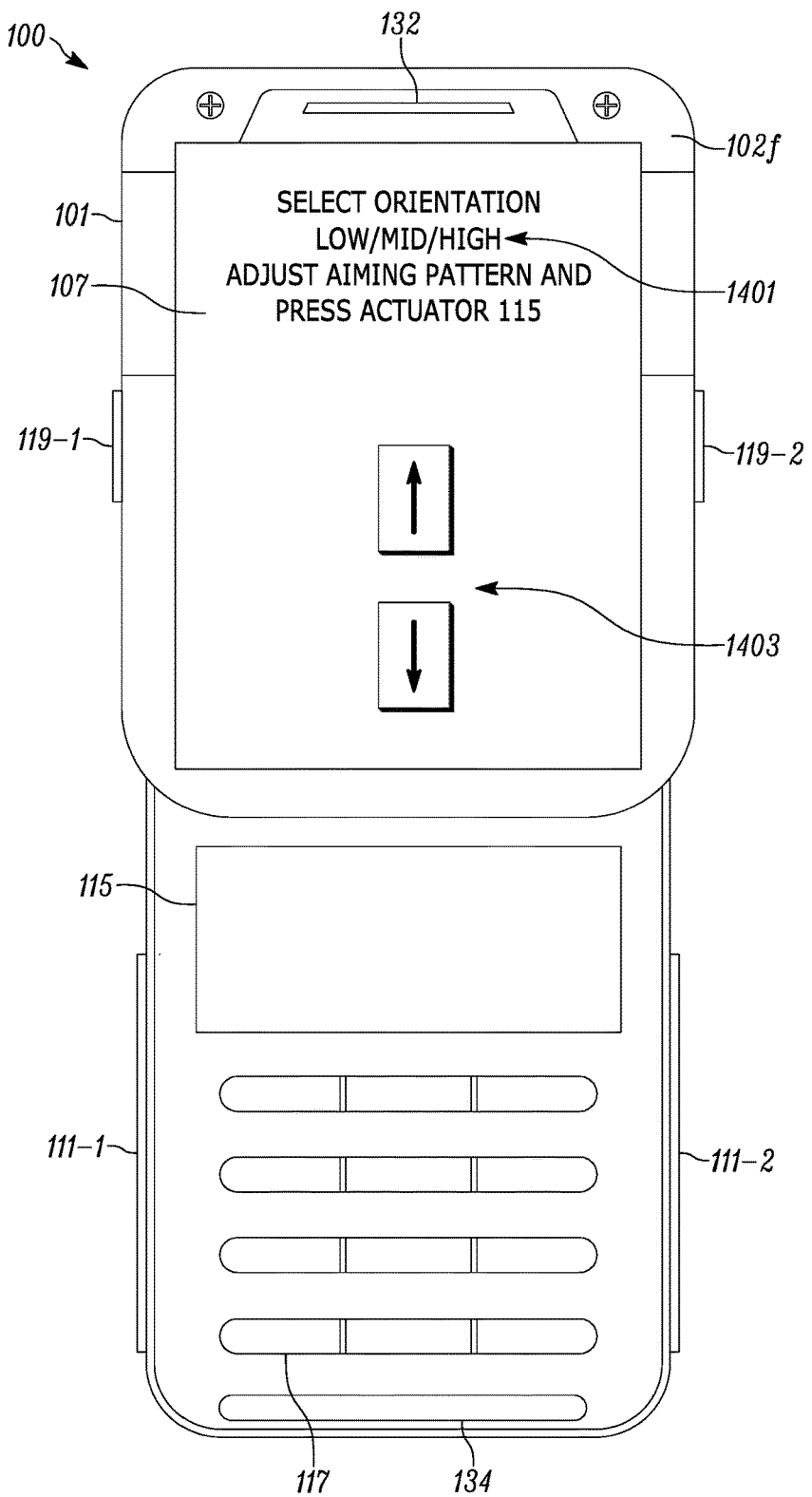
FIG. 14 depicts the mobile device of FIG. 1 in a learning mode to provision aiming pattern data, according to non-limiting implementations.

In the learning mode, as depicted in FIG. 14, controller 120 controls display 107 to optionally render an indication 1401 which includes instructions to select an orientation at which aiming pattern data is to be captured (e.g. a low, mid or high position, which may be selected using a touch screen, using a pull-down menu, a GUI and the like), as well as instructions for capturing aiming pattern data 273.

In addition, in the depicted aiming pattern learning mode, controller 120 control display 107 to optionally render one or more digital controls 1403 to control the aiming pattern of data capture component 105; for example, as depicted, one or more digital controls 1403 comprise digital buttons for raising (e.g. a digital button with an up-arrow) and lowering (e.g. a digital button with a down-arrow) aiming pattern (and/or a pointing direction) as described above with respect to FIG. 13. However, any other types of actuator may be used to control the aiming pattern and/or pointing direction of data capture component 105.

Furthermore, when the aiming pattern is controlled to a position compatible with the orientation, actuator 115, or any other actuator, may be actuated to store, at memory 122, aiming pattern data corresponding to the current aiming pattern at the selected orientation. Orientation data corresponding to the orientation sensed by orientation sensor 109 may also be stored at memory 122.

In some implementations, as the aiming pattern is being adjusted using digital controls 1403, and the like, device 100 may be held in a wrist neutral grip, at the associated orientation, with data to be captured provided in field-of-view, and the like, of data capture component 105, such as a barcode, and the like.

Figure 15:
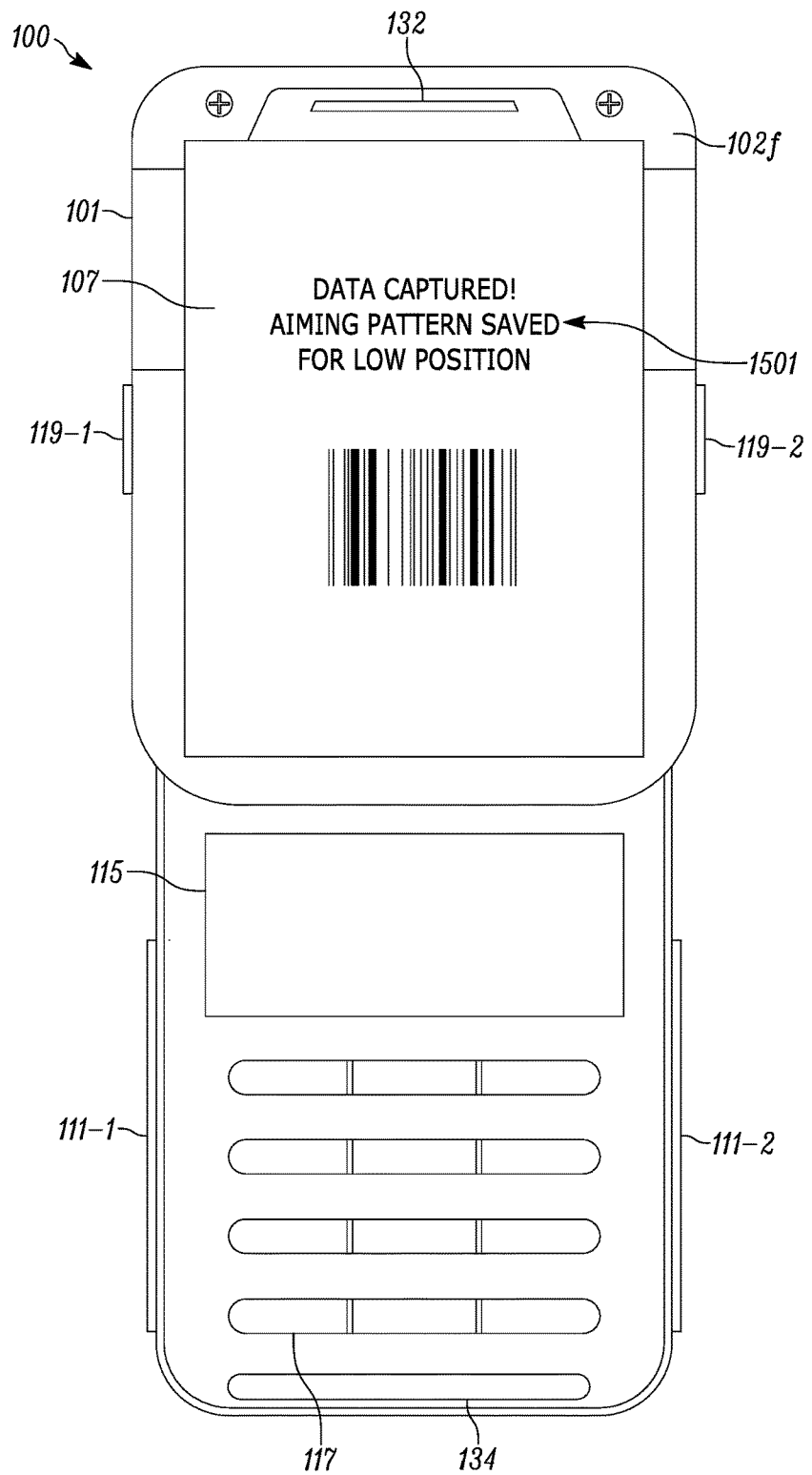
FIG. 15 depicts the mobile device of FIG. 1 in an alternative learning mode to provision aiming pattern data, according to non-limiting implementations.

With reference to FIG. 15, when the data is captured, controller 120 may control display 107 to render an indication 1501 thereof, and store the aiming pattern data corresponding to the current aiming pattern at the selected orientation at memory 122. Orientation data corresponding to the orientation sensed by orientation sensor 109 may also be stored at memory 122. Indeed, as depicted, indication 1501 includes a rendering of captured data (e.g. a barcode) and an indication that the aiming pattern was saved for a given position (e.g. a low position). Alternatively, at least portion of indication 1501 may be provided whenever aiming pattern data is stored for a given orientation.

Figure 16:
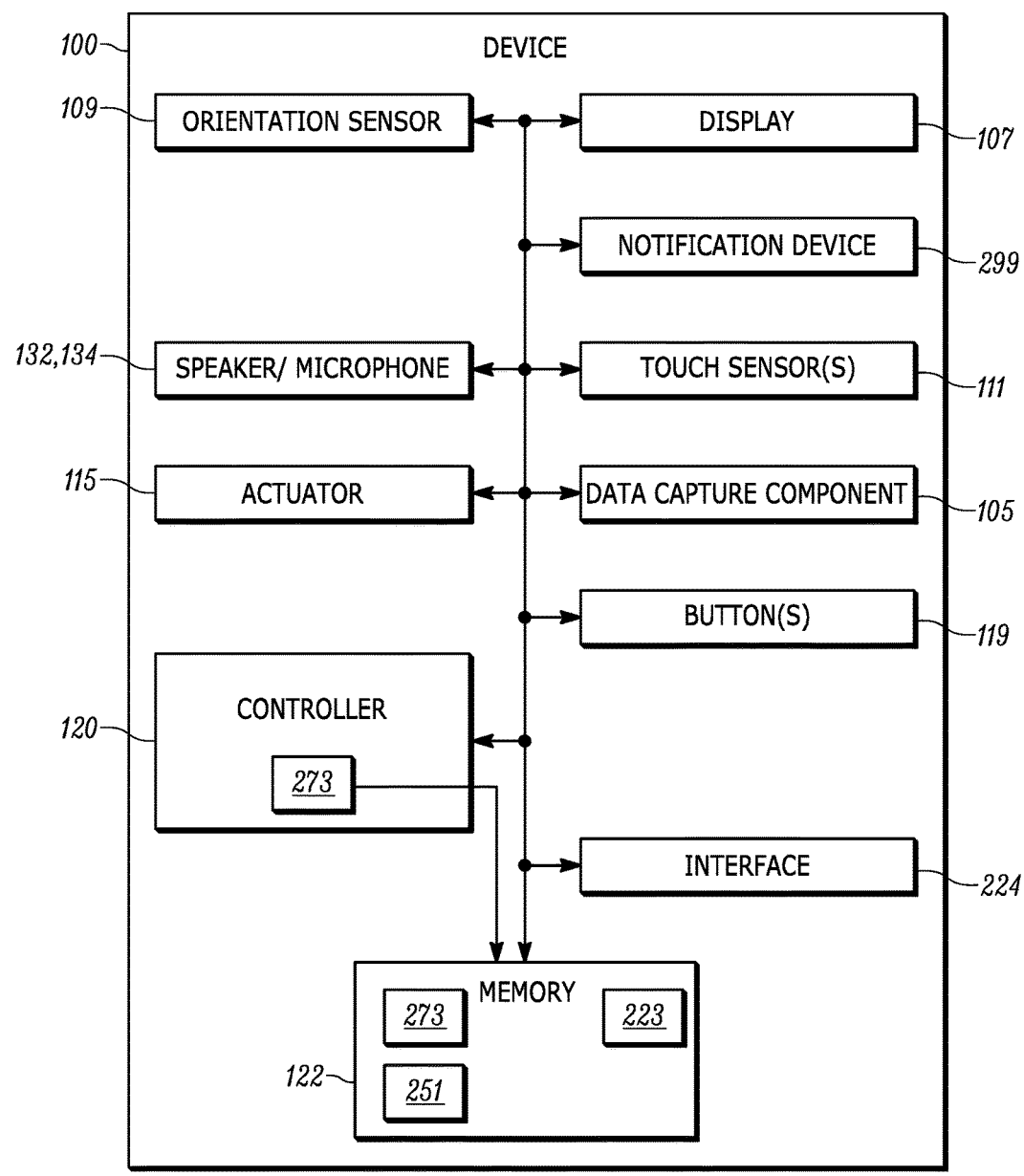
FIG. 16 depicts the mobile device of FIG. 1 storing aiming pattern data for a data capture component, according to non-limiting implementations.

Regardless, with reference to FIG. 16, controller 120 may store aiming pattern data 273 corresponding to a current aiming pattern of the learning mode at memory 122.

While not depicted, it is further appreciated that a reference orientation of device 100 may be provisioned in the aiming pattern learning mode. For example, when device 100 is oriented at a "mid" orientation, orientation data corresponding to the mid orientation may be stored as a reference orientation, and other orientations of device 100 determined with reference to the reference orientation. In other words, the orientation of device 100 may be determined from an arbitrary position, with orientation data from orientation sensor 109 configured accordingly. Alternatively, orientation data from orientation sensor 109 may be provide in absolute coordinates.

Furthermore, by providing one or more of indications 1401, 1501 at display 107 while aiming pattern data 273 is being determined, such that a user is encouraged to interact and/or view display 107, an aiming pattern of data capture component 105 should be compatible with display 107 being viewable at any orientation where aiming pattern data 273 is determined.

Furthermore, while the aiming pattern learning mode of block 503 is being implemented to acquire aiming pattern data, block 507 may be implemented in parallel to block 503 such that aiming pattern data is acquired in the learning mode only when housing 101 and/or device 100 is in wrist neutral position; in other words, indications 1401, 1501 may be at least temporarily replaced with indication 1201, and the like, to cause housing 101 and/or device 100 to be brought back to a wrist neutral position when housing 101 and/or device 100 leaves the wrist neutral position in the learning mode of FIG. 14 and FIG. 15. Indeed, in some implementations, aiming pattern data 273 is stored only when device 100 is in wrist neutral position.

As with wrist neutral touch data 223, aiming pattern data 273 may be particular for a given user. For example, a first user may hold device 100 slightly higher or lower in a given orientation and/or have a different grip that causes baseline position 1301 to be in a different orientation with respect to the ground and/or the earth, as compared to a second user. The learning mode depicted in FIG. 14, FIG. 15 and FIG. 16 may enable aiming pattern data 273 to be customized and/or provisioned for a particular user. Hence, controller 120 may be further configured to enter a learning mode to: determine aiming pattern data 273; and store aiming pattern data 273 in memory 122.

Indeed, once aiming pattern data 273 has been determined using a learning mode, such aiming pattern data 273 may be stored at memory 122 association with user credentials and/or transmitted to a server, and the like, in a cloud-based environment (e.g. using interface 224) for storage in association with the user credentials. Each time the associated user credentials are used to log-in to device, the aiming pattern data 273 may be provisioned to device 100 from the server (again using interface 224) and/or used by controller 120 to implement block 505 of method 500.

In particular, in some implementations, memory 122 may store aiming pattern data 273 associated with one or more orientations (e.g. of housing 101 and/or device 100), and controller 120 may be further configured to: when touch data 1123 matches wrist neutral touch data 223, control the aiming pattern of data capture component 105 according to aiming pattern data 273 associated with the orientation detected by orientation sensor 109. In some of these implementations, controller 120 may be further configured to enter a learning mode to determine the aiming pattern data for each of the one or more orientations. In some of these implementations, aiming pattern data 273 associated with one or more orientations may comprise: a low aiming pattern data associated with a low orientation, a mid aiming pattern associate with a mid orientation, and a high aiming pattern data associated with a high orientation, each of the low, mid and high orientations defined by a given angle, range of angles and/or set of orientation data.

Figure 17:
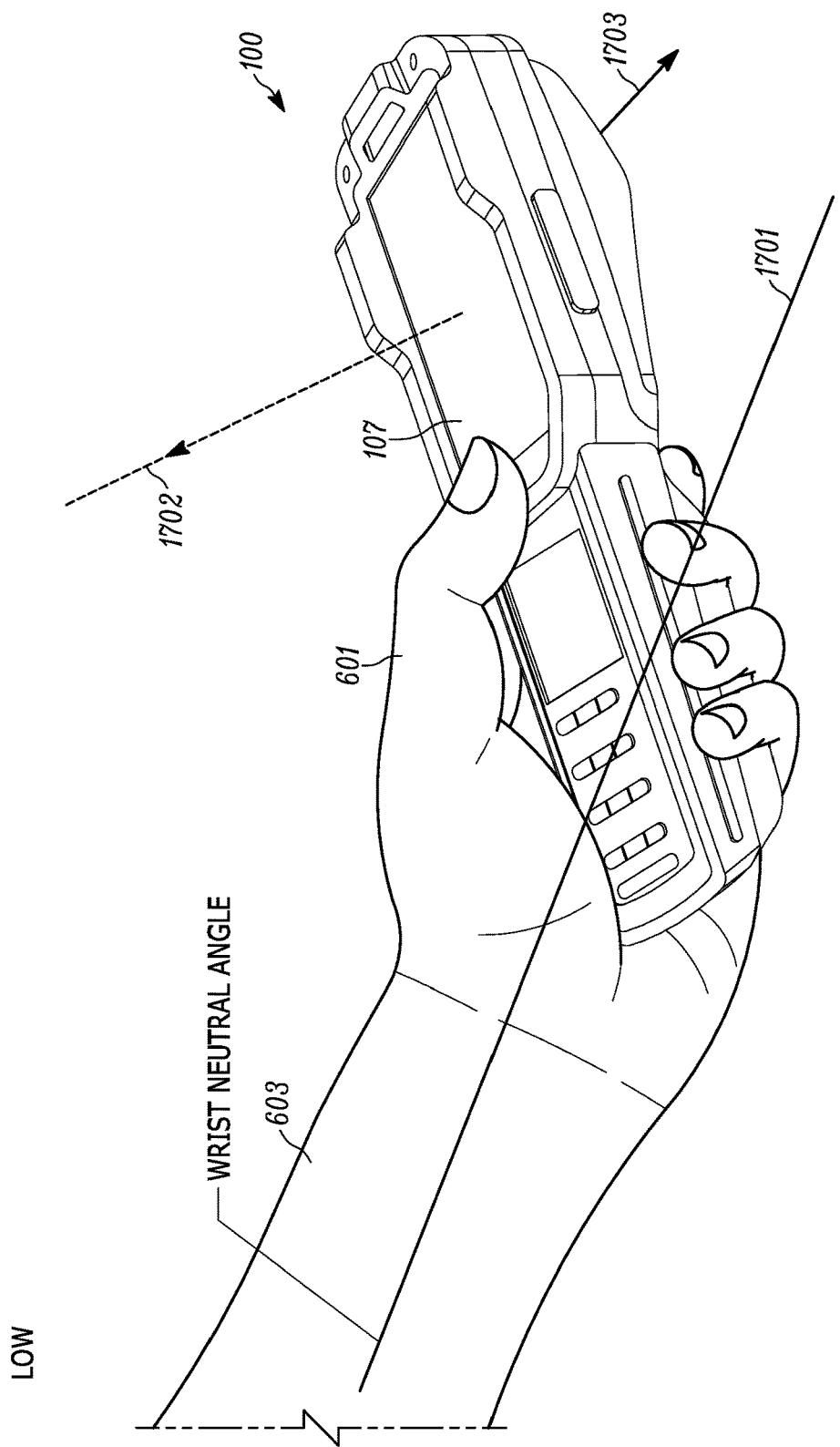
FIG. 17 depicts the mobile device of FIG. 1 controlling an aiming pattern of a data capture component according to a low orientation, according to non-limiting implementations.
Figure 18:
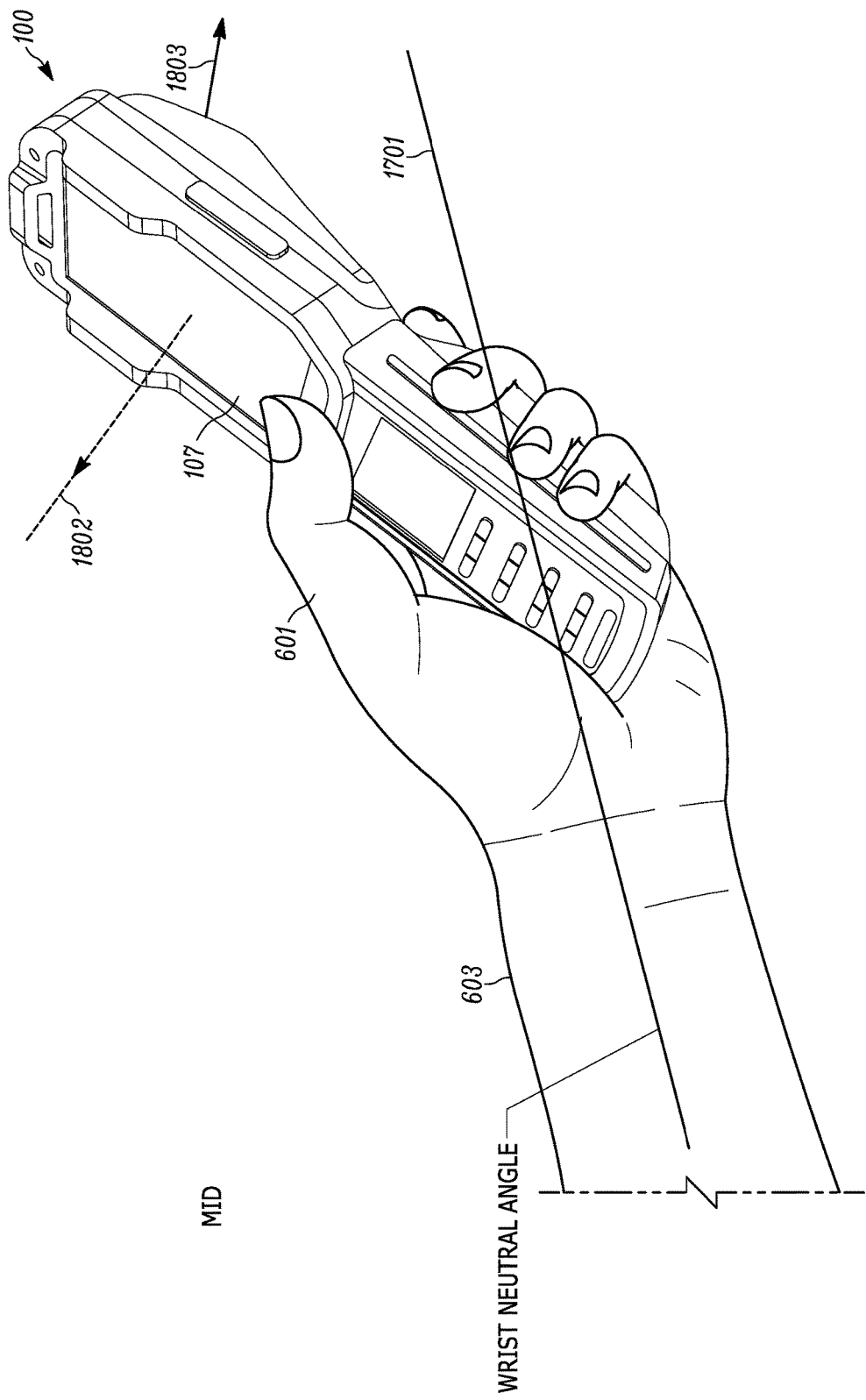
FIG. 18 depicts the mobile device of FIG. 1 controlling an aiming pattern of a data capture component according to a mid orientation, according to non-limiting implementations.
Figure 19:
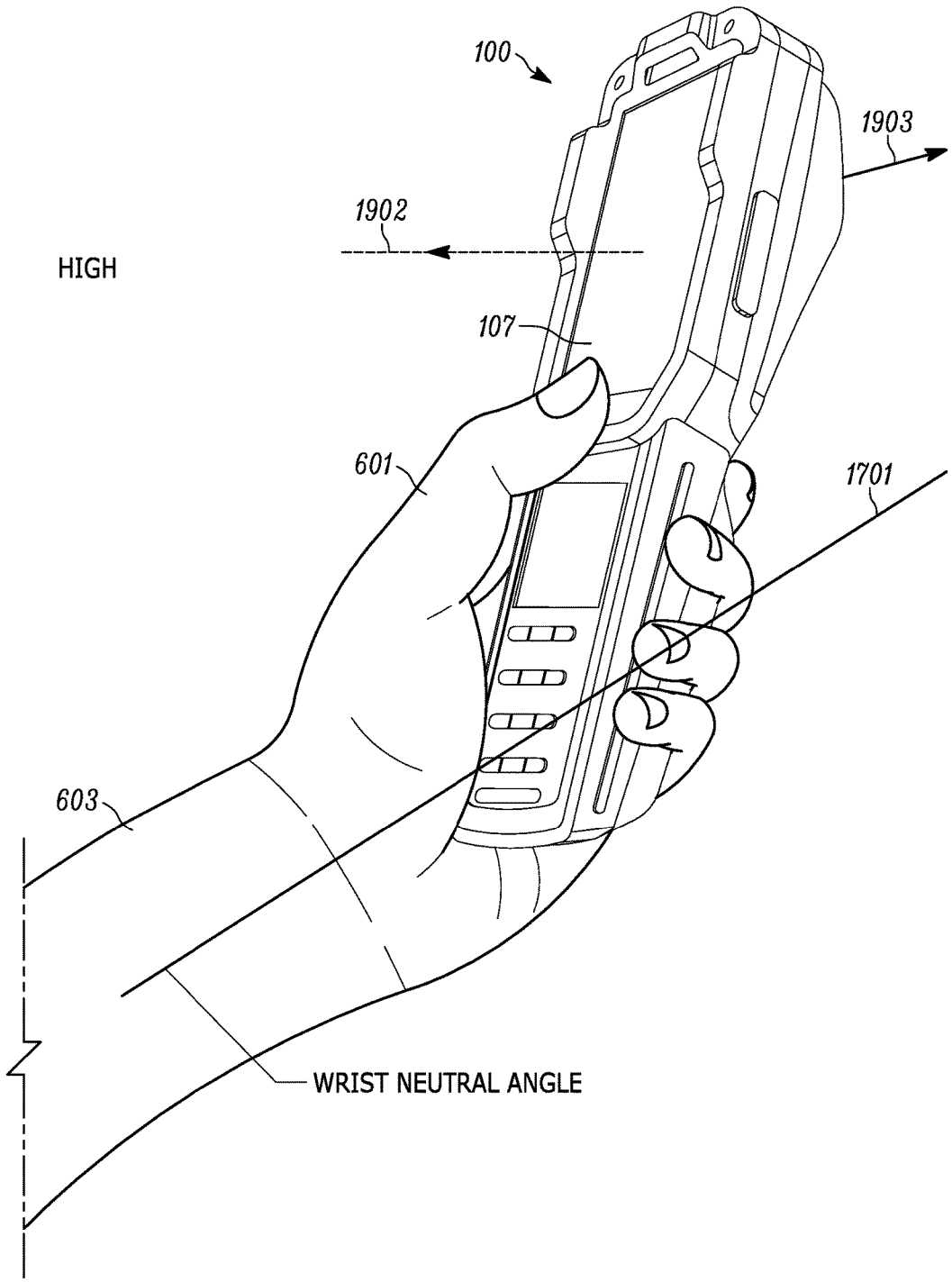
FIG. 19 depicts the mobile device of FIG. 1 controlling an aiming pattern of a data capture component according to a high orientation, according to non-limiting implementations.

Attention is next directed to FIG. 17, FIG. 18 and FIG. 19 which respectively depict device 100 being held by hand 601 at three orientations: a low orientation in FIG. 17, a mid orientation in FIG. 18 and a high orientation in FIG. 19. In each FIG. 17, FIG. 18 and FIG. 19, hand 601 is at a wrist neutral position and/or a wrist neutral angle to wrist 603, as indicated by line 1701. However, in the mid orientation of FIG. 18, hand 601 and wrist 603 has been raised as compared to the low orientation of FIG. 17, and/or lowered as compared to the high orientation of FIG. 19; in other words, a user raises and/or lowers their arm to capture data using device 100 (e.g. at objects at different positions), with hand 601 maintained in the wrist neutral position as the arm is raised and/or lowered. Such raising and/or lowering, however, may cause an orientation of device 100 (and/or housing 101) to change. In particular, device 100 may be positioned in each orientation such that display 107 is visible to user, as indicated, respectively, in each FIG. 17, FIG. 18 and FIG. 19, by arrows 1702, 1802, 1902.

Hence, at each orientation depicted in each FIG. 17, FIG. 18 and FIG. 19, controller 120 controls the aiming pattern and/or pointing direction of data capture component 105 according to the orientation detected by orientation sensor 109. For example, an average aiming pattern and/or average pointing direction of data capture component 105, in which data is captured, changes from orientation to orientation according to aiming pattern data 273 (e.g. at block 505 of method 500), and a pointing direction of data capture component 105 indicated, respectively, in each FIG. 17, FIG. 18 and FIG. 19, by arrows 1703, 1803, 1903. The aiming pattern data 273 that defines such pointing directions may be determined as described above with respect to FIG. 14, FIG. 15 and FIG. 16.

Furthermore, as at each orientation depicted in each FIG. 17, FIG. 18 and FIG. 19 display 107 is viewable by a user, the user does not need to tilt device 100 to view a data capture confirmation; rather, the aiming pattern of data capture component 105 is controlled at each orientation to capture data in a direction compatible with such viewing of display 107.

Provided herein is a device for wrist neutral data capture that includes touch sensors for detecting grip position locations to determine whether the device is being held according to a wrist neutral position. If not, an indicator is provided, and which may alternatively be provided until the device is brought back into the wrist neutral position and/or before data capture occurs. Such a device promotes wrist neutral ergonomics for data capture such as barcode scanning and barcode verifying under different data capture orientations and/or scanning conditions, and which may also eliminate and/or reduce a need to tile the device to view a display thereof as an aiming pattern of the data capture component is controlled according to an orientation of the device, and the aiming pattern may be controlled such that the display is visible to the user. Such implementations may lead to reduced wrist deviation, reduced wrist stress, reduced fatigue, a reduction in wasted motions, increased comfort and hence increased reserve capacity, increased accuracy, and increased productivity, may further enable workers to perform data capture with reduced physical effort.

In the foregoing specification, specific implementations have been described. However, one of ordinary skill in the art appreciates that various modifications and changes may be made without departing from the scope of the specification as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some implementations may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an implementation may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

We claim:

1. A mobile device comprising:
a housing having a front side and a rear side;
a data capture component disposed on the rear side of the housing, the data capture component configured to change an aiming pattern;
a display, disposed at the front side of the housing;
an orientation sensor configured to detect an orientation of the housing;
one or more touch sensors at the housing;
a memory storing wrist neutral touch data associated with a wrist neutral grip corresponding to predetermined grip position locations at the one or more touch sensors; and a controller configured to:
when touch data received at the one or more touch sensors matches the wrist neutral touch data stored in the memory, control the aiming pattern of the data capture component according to the orientation detected by the orientation sensor; and
when the touch data does not match the wrist neutral touch data, control a notification device to provide an indicator of the housing being out of the wrist neutral grip.

2. The mobile device of claim 1, wherein the memory further stores aiming pattern data associated with one or more orientations, and the controller is further configured to: when the touch data matches the wrist neutral touch data, control the aiming pattern of the data capture component according to the aiming pattern data associated with the orientation detected by the orientation sensor.

3. The mobile device of claim 2, wherein the controller is further configured to enter a learning mode to determine the aiming pattern data for each of the one or more orientations.

4. The mobile device of claim 2, wherein the aiming pattern data associated with one or more orientations comprises: a low aiming pattern data associated with a low orientation, a mid aiming pattern associate with a mid orientation, and a high aiming pattern data associated with a high orientation.

5. The mobile device of claim 1, wherein the controller is further configured to enter a learning mode to: receive the wrist neutral touch data from the one or more touch sensors; and store the wrist neutral touch data in the memory.

6. The mobile device of claim 1, wherein the controller is further configured to control the aiming pattern of the data capture component according to the orientation by changing the aiming pattern plus 10° or minus 10° from a baseline position.

7. The mobile device of claim 1, wherein the orientation is defined with respect to the front side of the housing.

8. The mobile device of claim 1, wherein the data capture component comprises one or more of a scanner and a camera.

9. The mobile device of claim 1, wherein the notification device comprises one or more of the display, an aural notification device, a visual notification device and a haptic notification device.

10. The mobile device of claim 1, wherein the orientation sensor comprises one or more of an accelerometer, a triaxial accelerometer, a 3-axis microelectromechanical system (MEMS) accelerometer, a three-dimensional orientation sensor, a magnetometer and a gyroscope.

11. A method comprising:
    storing, in memory of a mobile device, wrist neutral touch data associated with a wrist neutral grip corresponding to predetermined grip position locations at one or more touch sensors of the mobile device;
    when touch data received at the one or more touch sensors matches the wrist neutral touch data stored in the memory, controlling an aiming pattern of a data capture component of the mobile device according to an orientation of a housing of the mobile device detected by an orientation sensor; and
    when the touch data does not match the wrist neutral touch data, controlling a notification device to provide an indicator of the housing being out of the wrist neutral grip.

12. The method of claim 11, wherein the memory further stores aiming pattern data associated with one or more orientations, and the method further comprises:
    when the touch data matches the wrist neutral touch data, controlling the aiming pattern of the data capture component according to the aiming pattern data associated with the orientation detected by the orientation sensor.

13. The method of claim 12, wherein the method further comprises entering a learning mode to determine the aiming pattern data for each of the one or more orientations.

14. The method of claim 12, wherein the aiming pattern data associated with one or more orientations comprises: a low aiming pattern data associated with a low orientation, a mid aiming pattern associate with a mid orientation, and a high aiming pattern data associated with a high orientation.

15. The method of claim 11, wherein the method further comprises entering a learning mode to: receive the wrist neutral touch data from the one or more touch sensors; and store the wrist neutral touch data in the memory.

16. The method of claim 11, wherein the method further comprises controlling the aiming pattern of the data capture component according to the orientation by changing the aiming pattern plus 10° or minus 10° from a baseline position.

17. The method of claim 11, wherein the orientation is defined with respect to the front side of the housing.

18. The method of claim 11, wherein the data capture component comprises one or more of a scanner and a camera.

19. The method of claim 11, wherein the notification device comprises one or more of the display, an aural notification device, a visual notification device and a haptic notification device.

20. A non-transitory computer-readable medium having stored thereon computer executable instructions, the instructions comprising:
    storing, in memory of a mobile device, wrist neutral touch data associated with a wrist neutral grip corresponding to predetermined grip position locations at one or more touch sensors of the mobile device;
    when touch data received at the one or more touch sensors matches the wrist neutral touch data stored in the memory, controlling an aiming pattern of a data capture component of the mobile device according to an orientation of a housing of the mobile device detected by an orientation sensor; and
    when the touch data does not match the wrist neutral touch data, controlling a notification device to provide an indicator of the housing being out of the wrist neutral grip.

* * * * *